United States Patent [19]

Hutchison et al.

[11] Patent Number: 5,084,870
[45] Date of Patent: Jan. 28, 1992

[54] NETWORK TOPOLOGY CONTROL METHOD AND APPARATUS

[75] Inventors: Jerry Hutchison, Littleton; Henry Yang, Andover; William Hawe, Pepperell, all of Mass.

[73] Assignee: Digital Equipment Corporation, Maynard, Mass.

[21] Appl. No.: 584,802

[22] Filed: Sep. 19, 1990

Related U.S. Application Data

[63] Continuation of Ser. No. 224,038, Jul. 25, 1988, abandoned.

[51] Int. Cl.⁵ ............................ H04J 3/24; H04J 3/02
[52] U.S. Cl. ................................ 370/94.1; 370/94.3; 370/85.13; 370/85.14
[58] Field of Search ................. 370/85.1, 85.13, 85.14, 370/94.1, 94.3, 60, 60.1, 85.15

[56] References Cited

U.S. PATENT DOCUMENTS

| | | | |
|---|---|---|---|
| 4,587,651 | 5/1986 | Nelson et al. | 370/85.13 |
| 4,644,532 | 2/1987 | George et al. | 370/94.3 |
| 4,825,206 | 4/1989 | Brice, Jr. et al. | 370/94.1 |

OTHER PUBLICATIONS

ANSI Subcommittee X3T9.5, "FDDI Station Management (SMT)" in document No. X359.5/84-49, Aug. 1, 1987.

Rom et al., "A Reconfiguration Algorithm for a Double-Loop Token-Ring Local Area Network", IEEE Transactions on Computer, vol. 37, No. 2, pp. 182-189, Feb. 1988.

"Fiber Distributed Data Interface (FDDI)—Token Ring Physical Layer Protocol (PHY)", American National Standard, ANSI X3.148, 1988.

"Fiber Distributed Data Interface (FDDI)—Token Ring Media Access Control (MAC)", American National Standard, ANSI X3.139, 1987.

*Primary Examiner*—Douglas W. Olms
*Assistant Examiner*—Wellington Chin
*Attorney, Agent, or Firm*—Finnegan, Henderson, Farabow, Garrett and Dunner

[57] ABSTRACT

A method and apparatus for detecting invalid network topologies in a local area network (LAN). The stations comprising the LAN include single attachment stations (SAS), dual attachment stations (DAS), wire concentrators (WC), and DAS/WC combination stations. Adjacent stations exchange connection type information identifying a type of physical connection of the station sending the connection information. A station receiving the connection information determines whether the connection is valid for its physical connection type using a connection matrix. Invalid connections can result in a network topology where stations are physically connected, but are not logically connected, because the stations do not all form a primary ring. Invalid connections may be rejected and bypassed in each station. Alternately, a station detecting an invalid connection may reconfigure itself using an internal data switch. The actions of each station, taken together, achieve a globally designated primary ring.

62 Claims, 13 Drawing Sheets

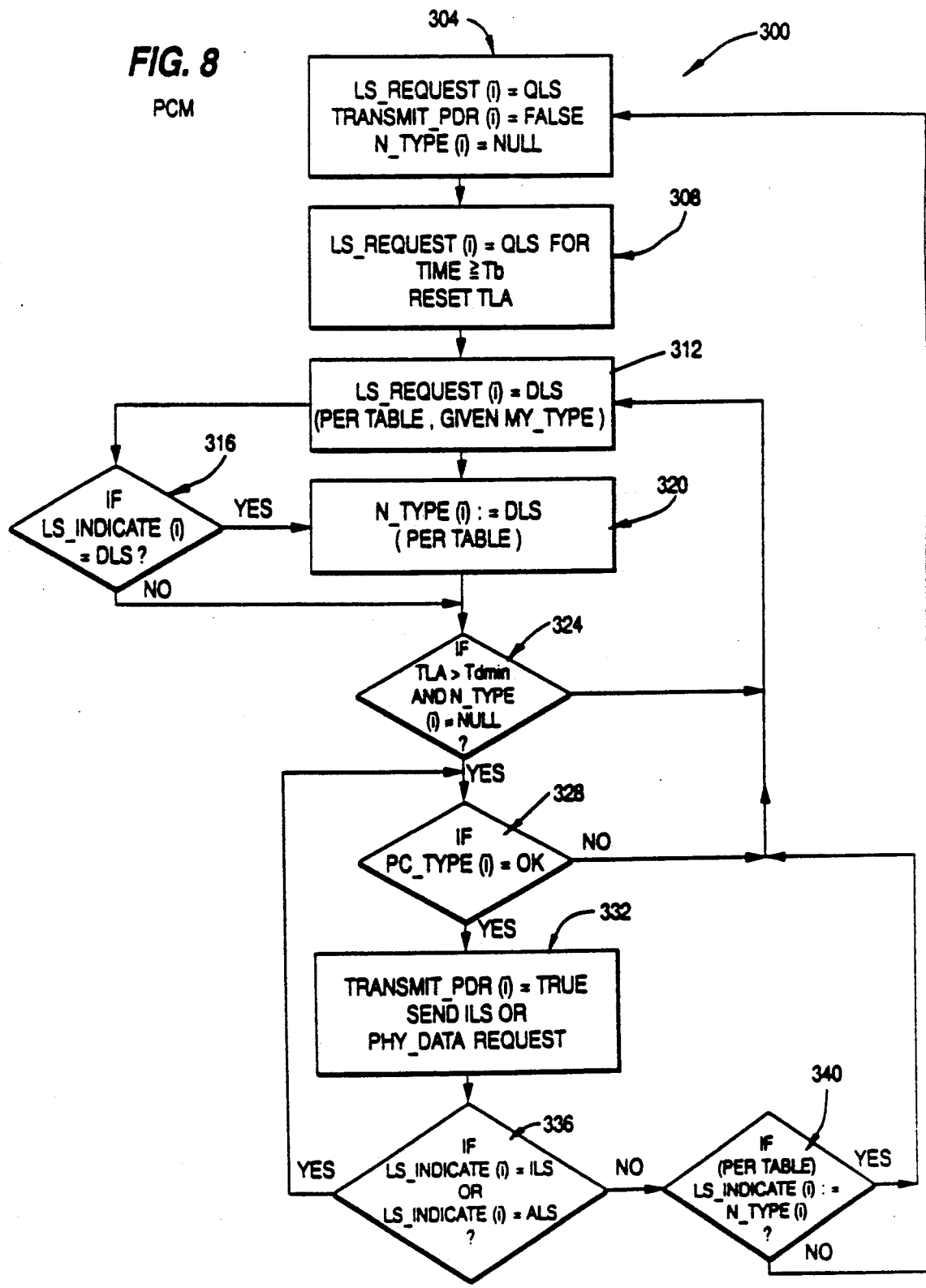

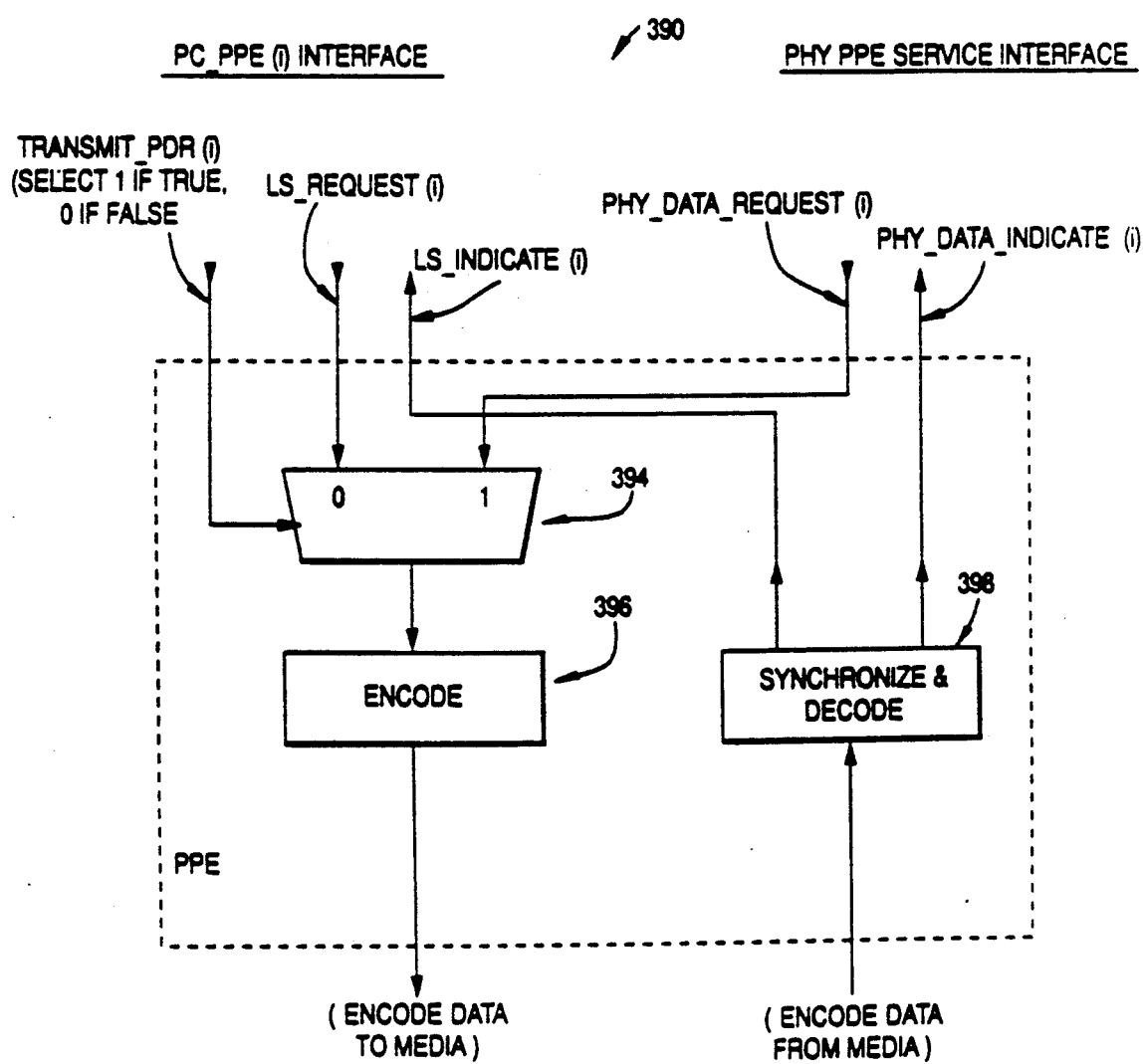

NETWORK TOPOLOGY CONTROL METHOD AND APPARATUS

This is a continuation of an application Ser. No. 224,038, filed Jul. 25, 1988, now abandoned.

BACKGROUND OF THE INVENTION

I. Field of the Invention

This invention relates to computer local area networks and in particular to a method and apparatus for enforcing valid network topologies.

II. Description of the Related Art

Local area networks (LANs) interconnect a collection of stations for the purpose of exchanging information over a communications channel. LANs that cover extended distances and/or are based on fiber optics may configure a "ring" from a number of individual point to point physical connections between the stations comprising the network to form the communication channel. Such rings are exemplified by the FDDI (Fiber Distributed Data Interface) proposed by American National Standards Institute (ANSI) and IEEE standard 802.5-1985 "American National Standard for Token Ring Access Method," ANSI X3.139-1987, "Fiber Distributed Data Interface Media Access Control (MAC)," and ANSI X3.148-1988, "Fiber Distributed Data Interface Physical Layer Protocol (PHY)."

Double loop rings are often configured rather than single loop rings. In a double loop ring, each ring in fact consists of a primary and a secondary ring. The stations, or nodes, making up the LAN may be combinations of single attachment stations (SAS) 10 of FIG. 1A, having a single physical attachment point (which includes the media, or the hardware comprising the communication link to an adjacent station), dual attachment stations (DAS) 12 of FIG. 1B, having two attachment points, wire concentrators (WC) 14 of FIG. 1C, having many attachment points, and combination DAS/WC stations 16 of FIG. 1D having two attachment points on the DAS side and several attachment points on the WC side and internal connections (not shown) between the WC and the DAS. Each connection between two station attachment points is called a Physical Connection (PC) and has two physical links which carry signals in opposite directions and from which the LAN communications channel is configured. The communications channel may be configured as a physical loop with "trees" branching to stations not on the ring. In normal operation, the two rings are often formed into one ring, which will be called the primary ring.

An example of a LAN configured as a ring of trees of the above mentioned station types is shown by LAN 20 of FIG. 2. The two physical links of each PC are connected to other PC's to provide two rings, a primary ring 22 and a secondary ring 24. Use of two rings ensures tolerance to station or channel failure as explained by Rom et al. in "A Reconfiguration Algorithm for a Double-Loop Token-Ring Local Area Network," IEEE Transactions on Computers, Vol 37, No. 2, February 1988. The network automatically reconfigures to eliminate the failed element and resume operation, as shown by LAN 50 of FIG. 3 where loopbacks 54 and 58 "heal" the ring and permit continued operation by the attached stations.

LAN stations may conform to the reference model Open Systems Interconnection (OSI) which calls for a layered station organization as proposed by the International Standards Organization and described by A. S. Tanenbaum in "Computer Networks," Prentice Hall, Inc., 1981, pages 16–21. Each station contains a Physical (PHY), Data Link, Network, Transport, Session, Presentation, and Application layer.

PHY provides electrical and/or optical connections, encodes and decodes the signals for all higher layers, and essentially supports a communication channel from one station to another and transmits and receives data to and from the PHY of a connected station.

The data link layer contains Media Access Control (MAC) which controls access to the communications media or channel, and the transmission of data packets to and receipt of data packets from the MACs of other stations using individual (MAC) addresses. A data packet is a sequence of data bits on the communications channel which contain the information to be passed from station to station. Connection management (CMT) controls the internal interconnection of the PHY and MAC entities within a station, the external configuration (topology), and establishes the logical connection between adjacent stations.

A DAS is a station, which when its connections type "A" and "B" are connected to the connections type "A" and "B" of another DAS, provides a double loop ring, as shown in FIG. 2. The primary and secondary rings 22 and 24 comprise each of the double loops. A connection type "M" on a WC or DAS/WC forms a "tree" configuration when attached to the connection type "A" of another station, as shown in FIG. 4. Even though a connection type "M" has two physical links, each link forms a part of a single ring. Thus, a DAS/WC station forms a double loop ring with its connections type "A" and "B" and the branches of a tree with its connections type "M." The SAS connects to each branch as a "leaf" of a tree.

Many ring topologies that can be created from SAS, DAS, WC and DAS/WC stations have the undesirable property that two stations may be physically cabled together, i.e., physically connected, but still be unable to exchange MAC layer data packets, as will be shown below. The stations are thus physically connected to each other, but not logically connected, because although the stations are wired together, the internal configuration of the stations prevents data packets from one station on one ring from being received by another station which is not configured on that ring. Thus, stations are considered to be "PHY" connected if and only if they are spanned by a physical cable path where all physical connections in the path are considered usable for data transfer. Stations are logically connected if and only if they can exchange MAC protocol data units (PDUs).

DAS and DAS/WC stations are intended to form double loop rings when attached to other DAS and DAS/WC stations via their connections type "A" and "B." Current Station Management protocols, as described by ANSI subcommittee X3T9.5, "FDDI Station Management (SMT)" in document no. X3T9.5/84-49, 1 August, 1987, do not globally identify a primary or secondary ring and can result in topologies, such as the twisted ring topology of LAN 20 of FIG. 2, if the stations are inadvertently connected incorrectly. Stations connected to DAS/WC stations 28 and 32 are connected to the communications channel forming primary ring 22, but station 36 considers ring 24 to be the primary ring. Stations attached to DAS/WC 36 are therefore unable to communicate, i.e., are not logically connected with stations attached to DAS/WCs 28 and 32 which are configured on the primary ring.

WC or the WC portions of DAS/WC stations are commonly configured as trees, where a connection type "M" of a WC or DAS/WC connects to a connection type "A" of a DAS or DAS/WC. Stations connected as trees do not form double loop rings. Rather, a single ring is intended. LAN 100 of FIG. 4 is a tree comprising two DAS/WC stations which illustrates another illegal topology that can result from improperly connecting stations. SAS 110 is physically connected but not logically connected to the remaining SAS nodes.

For rings to be useful as LANs, the configuration of physical connections must occur automatically as connections are added to or removed from the ring. In the case of FDDI, this has led to the exclusive use of "duplex physical connections" which provide bidirectional communication between all stations in the ring.

Autoconfiguration protocols in use or proposed for ISO PHY and Data Link layers do not detect or correct illegal topologies. Rather, they assume that the network is a legal topology and then correct faults or failures in the LAN.

The spanning tree algorithm, which identifies and corrects (eliminates) illegal topologies, runs in the network layer, and is very complicated, but allows all connection types to be the same and still results in all possible topologies as legal by configuring all networks as trees. Implementation requires too much information to be exchanged by stations to allow the algorithm to run in the MAC layer or Physical layer. In traditional network layer solutions, stations must exchange information with other non-adjacent stations which results in a complex distributed "N-party" algorithm.

The objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the objects of the invention, and in accordance with the purposes of the invention as embodied and broadly described herein, a method is provided for controlling the topology of a local area network (LAN) having a plurality of stations, each of the stations being any one of a single attachment station (SAS), a dual attachment station (DAS), a wire concentrator station (WC), a SAS/WC station, or a DAS/WC station, the plurality of stations each being interconnected by duplex point to point physical connections, the method comprising the steps of: exchanging station connection information over the physical connections only between adjacent stations; determining, in each of the stations, by analysis of said exchanged connection information, the validity of all connections to each of said adjacent stations according to a predetermined connection list; identifying, in each of the stations, valid and invalid connections according to said connection list; and performing, in each of the stations, actions relating to the interconnections of the station, based on the results of the identifying step for the station, the actions of all the stations achieving a globally designated primary ring.

A local area network is also provided having a self controlling topology comprising: a plurality of stations, each of said stations being any one of a single attachment stations (SAS), a dual attachment station (DAS), a wire concentrator station (WC), an SAS/WC station or a DAS/WC station; a plurality of duplex point to point physical connections interconnecting said stations; means, in each station, for exchanging station connection information, including connection type information for the physical connections, over said physical connections only between adjacent stations; means for determining, in each of the stations by analysis of said exchanged information, the validity of all connections to each of said adjacent stations according to a predetermined connection list; means, in each station, responsive to the determining means, for identifying valid and invalid connections according to said connection list; and means, in each station, responsive to the identifying means, for performing actions relating to the interconnection of the station, the actions of all the stations achieving a globally designated primary ring.

The accompanying drawings, which are incorporated in and constitute a part of the specification, illustrate a preferred embodiment of the invention and, together with the general description given above and the detailed description of the preferred embodiment given below, serve to explain the principles of the invention.

BRIEF DESCRIPTION OF THE DRAWINGS

FIG. 8 is a flow chart of the functions performed by a physical connection module (PCM) incorporating the teachings of the present invention;

FIG. 10 is an electrical schematic diagram of a physical protocol entity (PPE);

DESCRIPTION OF THE PREFERRED EMBODIMENT

Reference will now be made in detail to the present preferred embodiment of the invention as illustrated in the accompanying drawings.

Figure 5:
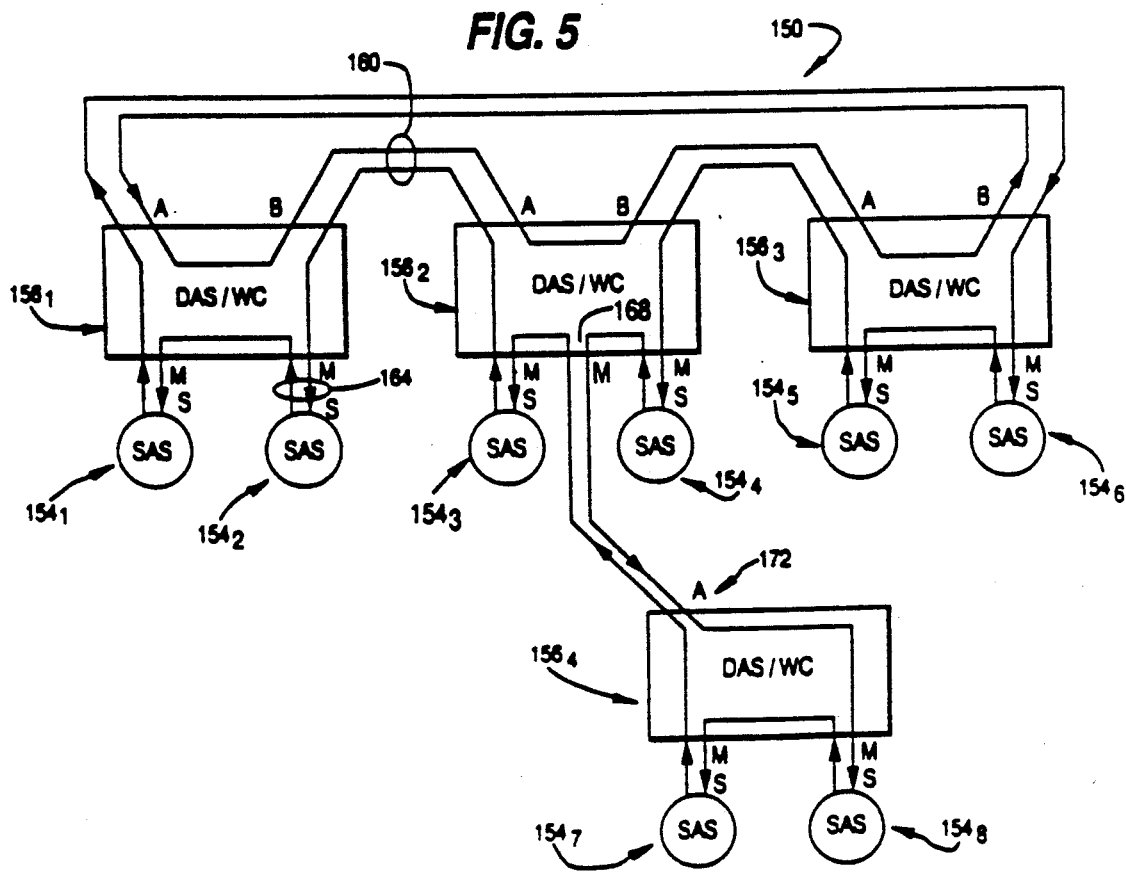
FIG. 5 is an electrical schematic diagram of a LAN configured as a ring of trees in a "legal" topology according to the teachings of the present invention.

LAN 150 of FIG. 5, having a self controlling topology, is shown by way of example and not as a limitation as comprising combinations of SAS stations $154_1$–$154_8$, WC stations, DAS stations and DAS/WC stations $156_1$–$156_4$ interconnected by duplex, point to point physical connections such as 160. This set of stations is necessary and sufficient to configure a double loop ring of trees topology and comprises a set of valid or "legal" station types. Other types of stations such as SAS/WC combination stations are not shown as they do not add new topology or behaviors over the given set. The DAS and WC stations are shown as combined as DAS/WC stations $156_1$–$156_4$. Although the two station types are combined into a single station, their individual functions remain the same whether applied singly or in combination.

Any subset of the DAS/WC is considered a valid station type. For example, in FIGS. 1A to 1D, stations 12 and 14 are subsets of station 16. A station type is defined by its connection types and internal behavior. Connection types are specified for the purposes of topology control. Each station type of FIGS. 1A–1D has a letter assigned to the physical connection type associated with the station. SAS 10 has a connection type "S," WC 14 has at least one connection type "M," DAS 12 has two connections, types "A" and "B," and DAS/WC 16 has the same "A," "B," and "M" connection types as the individual DAS and WC stations.

Connections type "A" and "B" are intended to form double loop rings when connected to other connections type "A" and "B" of other stations. DAS station 16 has connections type "A" and "B" for this purpose. Connections type "M" and "S" are intended to form a single logical ring on a physical branching topology of a tree. Concentrators have multiple connections type "M" for this purpose, and the connection type "S" and its SAS is considered to be a "leaf" on a tree. A concentrator may also be a node in a tree by use of a connection type "M" of one station to a connection type "A" of a second station. Alternatively, a connection type "B" may be used to connect to the node in a tree, but both a connection type "A" and a connection type "B" may not be used. A tree may have one data path up or down, but not two. Therefore the formation of trees is restricted to connections type "A" in the preferred embodiment. A tree is the connection of a connection type "M" of one station to a connection type "A" of another station. This is a separate, non-conflicting use of a connection type "A" in a WC, where the connection type "A" is not intended to attach to the double loop ring.

Not every possible topology comprising the four station types of FIGS. 1A–1D with the four connections type "A," "B," "M," and "S" is a legal topology, therefore a set of rules in the form of a validation list must be enforced concerning the connection types. The present invention provides control of a topology such that all connections which are offered by a user or installer for the LAN will have predictable and intuitively expected results, that is, adding a cable should never cause a reduction in the number of stations which can communicate, or the set of stations which communicate should never change because a distant station was powered off and then on. A topology which has this property is loosely defined as a "legal" topology.

The interconnections of the stations are determined to be either valid or invalid (also called legal or illegal) connections according to the following "connection matrix." An invalid or illegal connection also results in an "illegal" topology.

| "OTHER END" | "MY END" | | | |
|---|---|---|---|---|
| | A | B | M | S |
| A | I | V | V | I |
| B | V | I | I | I |
| M | RULE | I | I | V |
| S | I | I | V | V |

V = VALID
I = INVALID

Although LAN 150 comprises only 4 DAS/WC stations interconnected with each other and SAS stations to make a double loop ring LAN, any number of SAS, DAS, WC and DAS/WC stations may be interconnected providing the interconnections are valid according to the connection matrix. Application of the connection matrix to a topology results, among other things, in the global identification and enforcement of a primary ring.

In the preferred embodiment, a connection type "A" is defined to have the primary ring output. A requirement of a topology is to have a globally identified primary ring. This convention serves to resolve the symmetry in the dual ring. A connection type "B" is the PHY in a DAS that attaches to the primary ring input when attaching to the dual ring. Other conventions, such as where connections type "A" are the primary ring input may also be defined and enforced according to the invention with equal ease. It is a characteristic of connections type "A" and B that they form a double loop ring when connected to the connections type "A" and "B" of other DAS or DAS/WC stations. Connections type "A" and "B" in a DAS/WC are required to be adjacent to each other within the station, as will be discussed below. A connection type "S" is the PHY in a SAS. A connection type "M" is the PHY in a WC or DAS/WC that serves as a master to a connected station.

It is the characteristic of a connection type M to form a tree when connected to a connection type "A" or "S" of another station, but not both a connection type "A" and a connection type "B" otherwise a master/slave loop may exist, as will be discussed in more detail below. A tree is a single loop attachment rather than a double loop attachment to another station.

The connection types of the stations of FIGS. 1A-1D correspond to the column and row labels "A B M S" of the connection matrix. Looking at communications channel 160 of FIG. 5, one end is connected to a connection type "B" of DAS/WC station $156_1$ and the other end is connected to a connection type "A" of DAS/WC station $156_2$. Arbitrarily picking station $156_1$ as "MY END" and station $156_2$ as the "OTHER END," an "A" to "B" connection is marked with a V in the connection matrix. Therefore, it is a valid connection according to a preferred embodiment of the invention.

Looking now to communications link 164 between the connection type "M" of station $156_1$ and the connection type "S" of station $154_2$, the connection matrix shows that an "S" to "M" or "M" to "S" connection is valid. Note that an "S" to "S" connection is also valid, but results in a network of only two SASs.

"S" to "A" and "S" to "B" connections are shown as invalid by the connection matrix; however, attaching an SAS to a connection type "A" or "B" will not result in an invalid topology, rather, it will prevent that connection type "A" or "B" from being attached as part of a dual ring. The "S" to "A" or "B" connections have, therefore, been made invalid as a matter of convenience to prevent DAS and DAS/WC stations from being inadvertently "dead ended."

Figure 4:
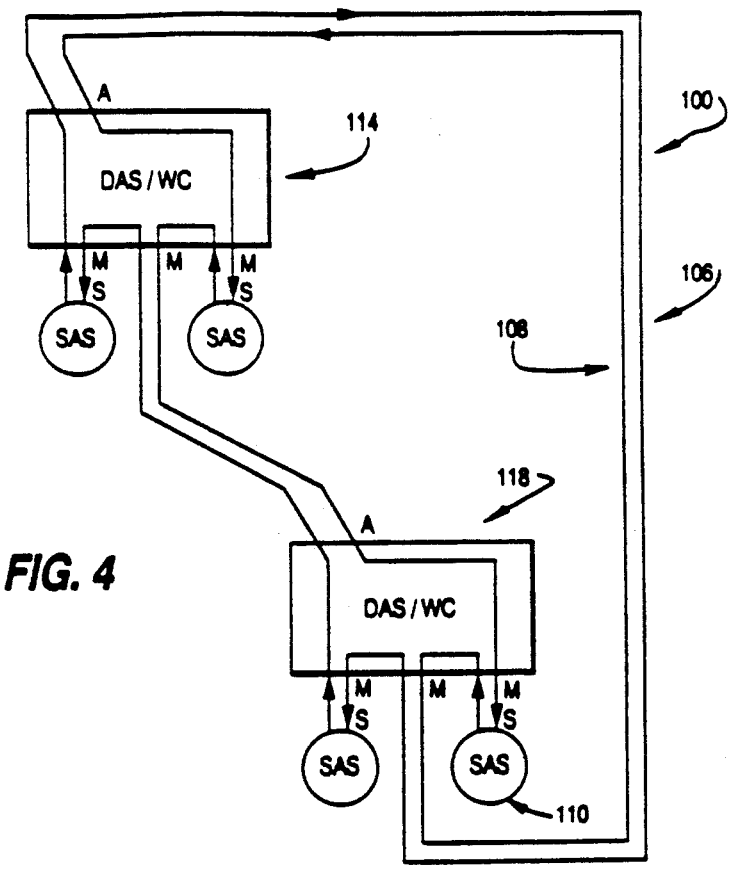
FIG. 4 is an electrical schematic diagram of a LAN improperly configured as tree of DAS/WC stations.

In all cases but one the connection matrix is symmetric, that is, a connection is valid or invalid regardless of which station is called "MY END." The exception is the "A" to "M" connection which must follow the "RULE." The Rule is:

"My A" may accept as valid a connection to an "M" if and only if "My M" or "My B" does not connect to an "A". The rule prevents the formation of master/slave loops when stations are connected in a tree, as shown in FIG. 4.

Application of the connection matrix to LAN topologies requires that the LAN stations comprise only the four specified types: SAS, DAS, WC, and DAS/WC (including any subset of a DAS/WC), and will result in LAN configuration of the stations as a double loop ring of trees.

Previously, a legal topology was defined loosely by the expectations of a LAN user. For the purpose of describing the invention, a legal topology is now strictly defined to have the following necessary properties:

(1) Logical connectivity equals physical connectivity as previously defined. This is true for stations which choose to attach to the globally identified primary ring.

Figure 1A:
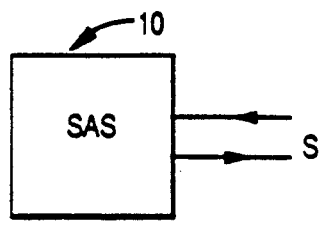
FIG. 1A is a schematic representation of a local area network (LAN) single attachment station (SAS)
Figure 1B:
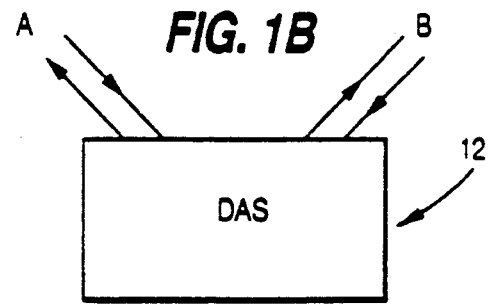
FIG. 1B is a schematic representation of a dual attachment station (DAS)
Figure 1C:
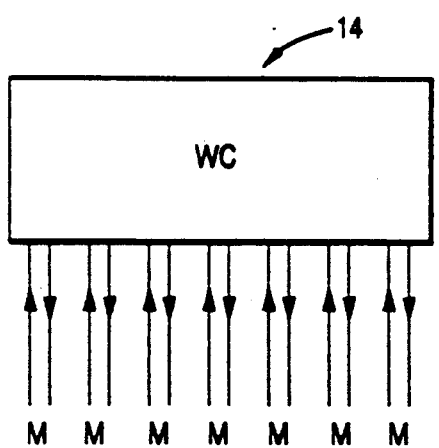
FIG. 1C is a schematic representation of a wire concentrator station (WC)
Figure 1D:
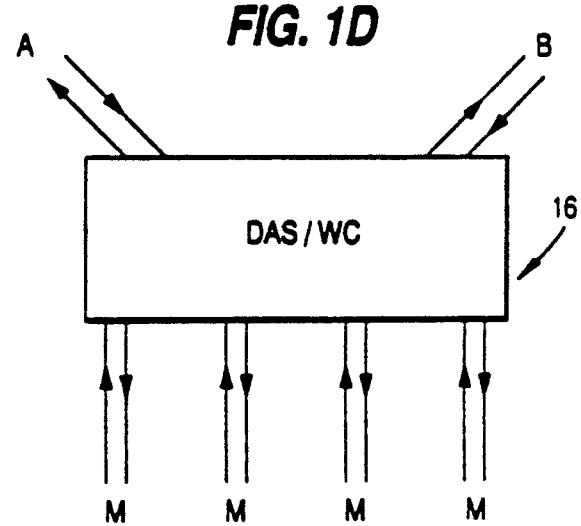
FIG. 1D is a schematic representation of a combination DAS and WC station (DAS/WC)
Figure 6:
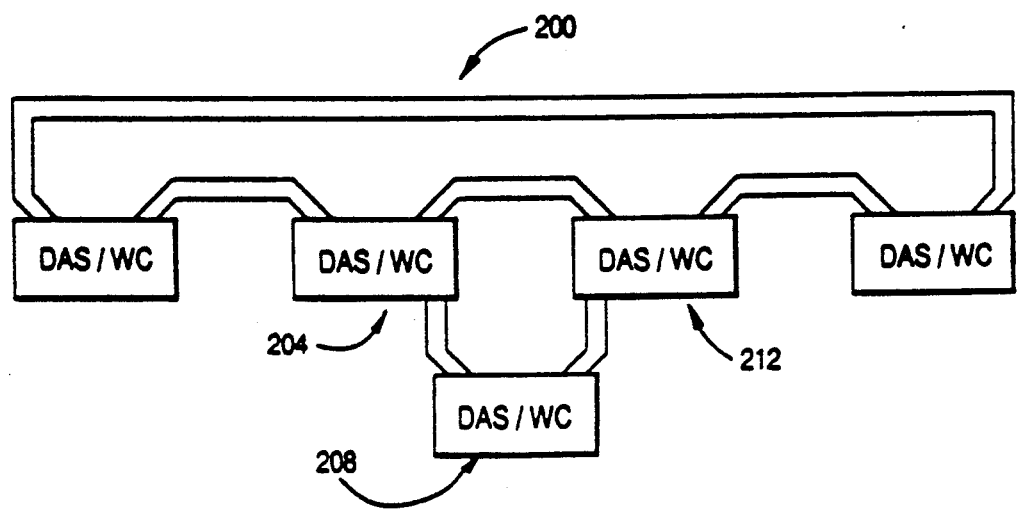
FIG. 6 is an electrical schematic diagram of a LAN configured as a ring of trees in an "illegal," non-deterministic topology according to the teachings of the present invention.

(2) The topology (and its representation) is deterministic for a given set of connections, that is, it must not be affected by reset or power-on sequences. (For example, LAN 200 of FIG. 6 is a non-deterministic topology, given that "A" to "M" and "B" to "M" connections are not allowed. If station 204 powers on first, then station 208 is connected to station 204. If station 212 powers on first, then station 208 is connected to station 212);

(3) Any subset of a legal topology must be a legal topology, that is, connectivity is lost if and only if physical connectivity is lost (a physical path may not be invalidated by the removal of another physical path); and (4) There exists exactly one ring named "primary" which is globally unique within any physically connected set of stations.

A "legal" topology comprises only valid connections according to the connection matrix and has the property that all stations physically connected by the LAN are also logically connected to the LAN, that is, each station will be able to autoconfigure to send and receive MAC sublayer messages, also called frames or MAC PDUs, to and from all other stations connected to the ring.

Figure 2:
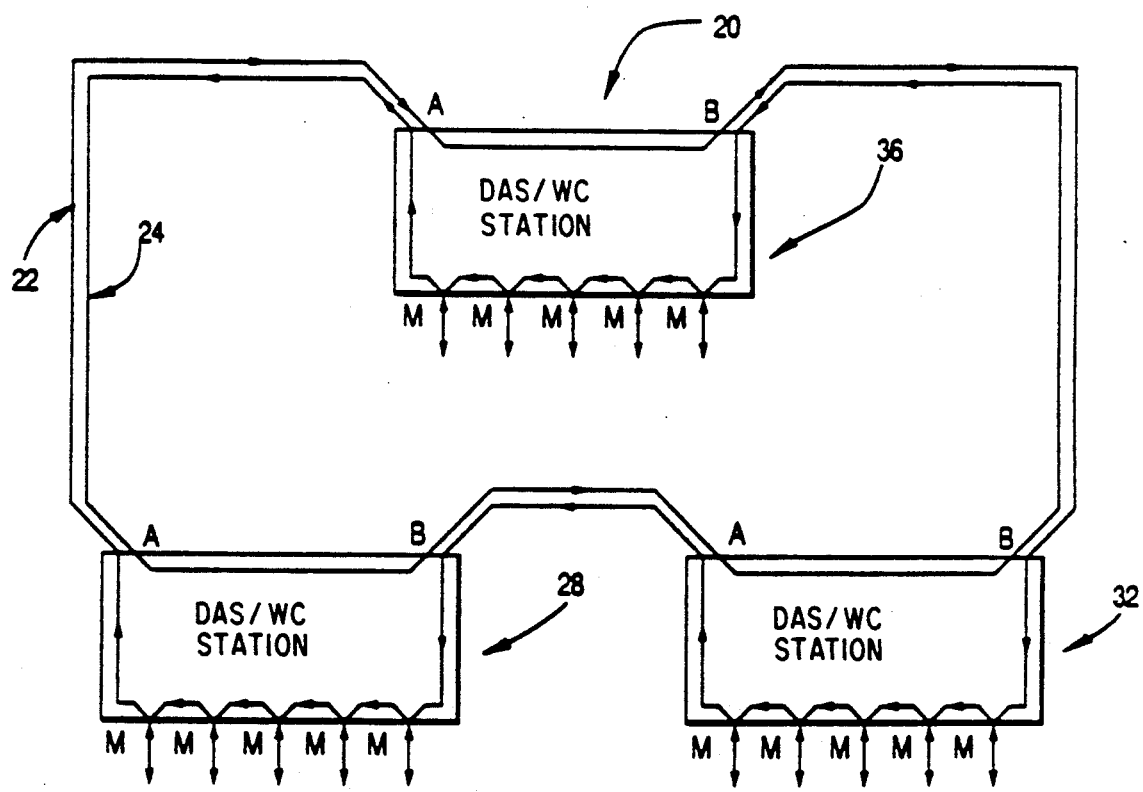
FIG. 2 is an electrical schematic diagram of a LAN configured as a ring of trees using the types of stations of FIGS. 1A–1D.
Figure 3:
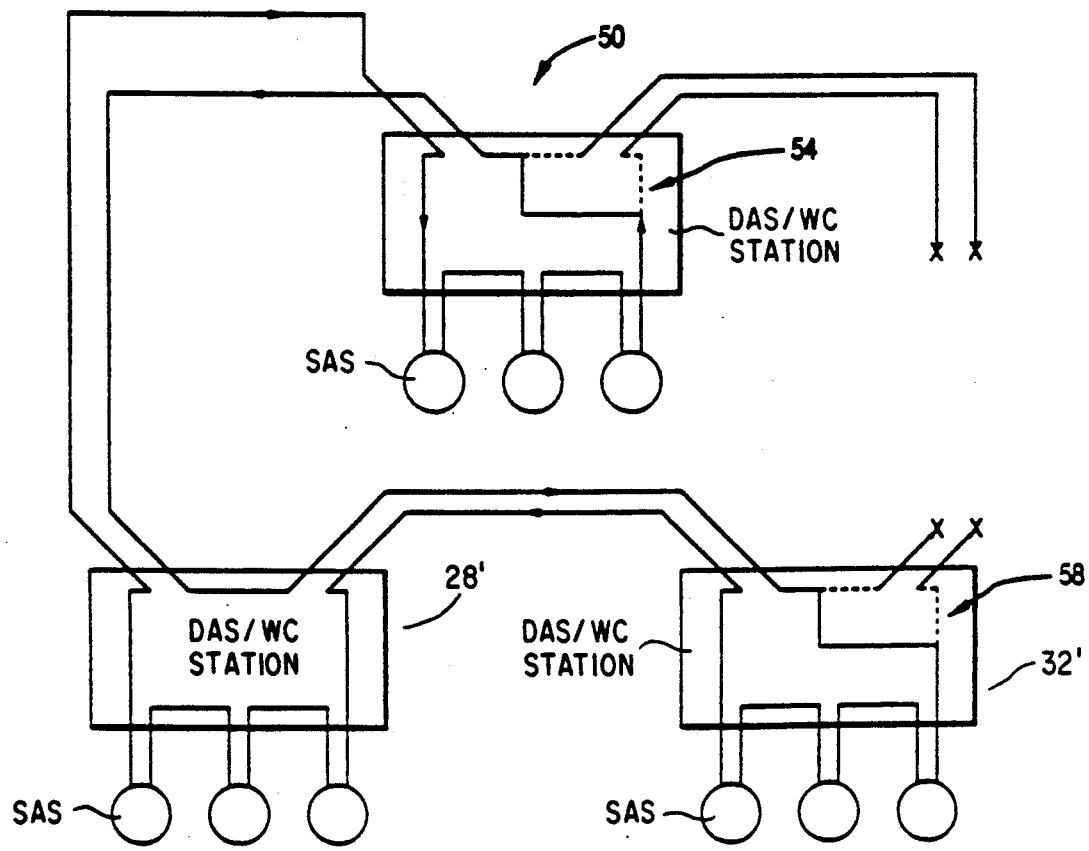
FIG. 3 is an electrical schematic diagram of the LAN of FIG. 2, reconfigured to "heal" a communications channel fault.

FIG. 2 is an example of a conventional LAN having an "illegal" topology, that is, all stations are physically connected but some stations are not logically connected and thus from a user perspective, have invalid connections. The primary ring is not unique or globally identified, and the resulting configuration is a "twisted loop." DAS/WC stations 28, 32 and 36 and their attached SASs (not shown) are physically connected and form a dual ring, 22 and 24, but the SASs attached to DAS/WC stations 28 and 32 are connected to primary ring 22, while the SASs of DAS/WC station 36 are connected to secondary ring 24 and they are not logically connected to the stations on the primary ring. One may wish to intentionally configure a LAN in the manner of LAN 20, that is, have some stations on the primary ring and other stations on the secondary ring, but without the benefit of the invention, there is no facility such that a system manager may command a station to autoconfigure to make a logical connection happen or not happen. With the benefit of the invention, by identifying specific double loop ring attachments of DAS and DAS/WC stations as connections type "A" and "B," the primary ring can be globally identified and enforced to prevent inadvertently mis-connecting stations on either ring.

Applying the connection matrix to the stations of FIG. 2, the connection type "A" of station 36 to the connection type "A" of station 28 is identified as invalid and the cause of the non-unique primary ring. The "B" connection of station 32 to the "B" connection of station 36 is also an invalid connection according to the connection matrix.

LAN 100 of FIG. 4 is another example of an "illegal" topology. WC stations 114 and 118 are connected as for a tree, but with too many connections such that a physical (master/slave) loop occurs resulting in primary ring 106 and an unintended ring 108. Stations 114 and 118 are examples of WC stations that each have a connection type "A" so that the WC may form a master/slave tree configuration with another station. The WC station having a connection type "A" may also be considered to be a DAS/WC with an unused connection type "B." SAS 110 is physically connected to station 118, but is logically connected to unintended ring 108, whereas the remaining SASs are logically connected to primary ring 106 and therefore cannot communicate with SAS 110.

Taking station 114 as "MY END" and applying the connection matrix shows that the M" to "A" connection of station 114 to station 118 is invalid, as is the "A" to "M" connection of station 114 to station 118. By the rule, station 114 may not accept an "A" connection to a station 118 "M" connection because station 114 already has an "M" that connects to an "A." The same rule applies to the "M" to "A" connection of station 114 to station 118. Thus the LAN has an "illegal" topology which would result in a lack of connectivity.

Application of the connection matrix to LANs having stations limited to the four station types of FIG. 1 with their four connection types, obviates the need to consider complex station interconnections and allows simple solutions to LAN topology. By working within these constraints, LAN topology control is achieved using multiple instances of distributed two-party algorithms that base decisions only on the exchange of local information. By restricting the set of configuration types and configuration rules, and requiring the configuration types of immediately adjacent stations to be learned or known for a physical connection, the global topology may be spanned by a single primary ring, and other previously discussed "legality" requirements are met. These restrictions eliminate the need to exchange large numbers of messages about and among non-adjacent stations such as are needed to apply the spanning tree algorithm. As a result, in a LAN incorporating the teachings of the present invention, topology management is done in the Physical layer using only four unique messages (line states) to signal connection types. Physical Connection Management (PCM) manages the physical connection which exists between one station's PHY and an adjacent station. PCM initializes the connection of the neighboring PHYs and manages PHY signaling.

In operation, application of the rules of the connection matrix to automatically control the topology of a LAN comprising combinations of the stations of FIG. 1 arranged in a ring of trees configuration is implemented in SCM.

In accordance with the invention, a method is provided for automatic controlling of LAN topology which begins during power up of a station by exchanging station connection information over the physical connections between immediately adjacent stations using messages that are easily transmitted using only PHY layer signaling. PHY layer signaling provides the advantage that individual MAC addresses are not required. In a preferred embodiment of the invention, shown by way of example and not as a limitation, the PHY of each station signals its connection type to an adjacent connected station using Physical layer symbols well-known in the art. The adjacent station accepts connections from other stations identified by only a limited set of Physical layer symbols, depending on its own connection type.

In the preferred embodiment, Physical layer symbols comprise combinations of line states. A line state is a sequence of more than 15 symbols. A master line state (MLS) is a series of alternating HALT and QUIET symbols. A halt line state (HLS) is a stream of HALT symbols. A quiet line state (QLS) is a series of QUIET line symbols. An idle line state (ILS) is a stream of IDLE line symbols, and an idle quiet line state (IQLS) is an alternating series of IDLE and QUIET symbols.

The line state messages sent or accepted by each connection type are shown in the connection type line state table, below.

| CONNECTION TYPE | SENDS | ACCEPTS |
|---|---|---|
| A | IQLS | MLS, HLS |
| B | HLS | IQLS |
| M | HLS | HLS, IQLS |
| S | HLS | HLS, MLS |

Each connection type has a specified behavior, and this set of connection types allows construction of the most desirable topologies for the LAN. The symbols sent and accepted by the connection types of the line state table correspond to the valid connections permitted by the connection matrix, as will be described in more detail below.

The signaling method of the line state table for adjacent stations is one of many effective methods. Another method of signaling would be to send unique combinations of multiple line state sequences to indicate each connection type. Encoding could be used where one line state could represent a "1" and another line state could represent a "0," and a series of line states could be sent to indicate multiple bits of information. ILS followed by MLS could be the "1" and ILS followed by HLS could be "0." Unique combinations of "bits" could represent each connection type. The same messages may also be sent in MAC PDUs.

Looking at station $156_2$ of FIG. 5, a connection type "M" 168 is connected to a connection type "A" 172 of station $156_4$. Connection type "M" 168 sends an "M message" to the immediately adjacent station to which it is connected, i.e., connection type "A" 172. Connection type "A" 172, according to the line state table, sends an "A message" and accepts an "M message." Connection type "M" 168 accepts the "A message." Therefore, the connection of connection type "M" 168 to connection type "A" 172 is a valid connection.

Figure 7:
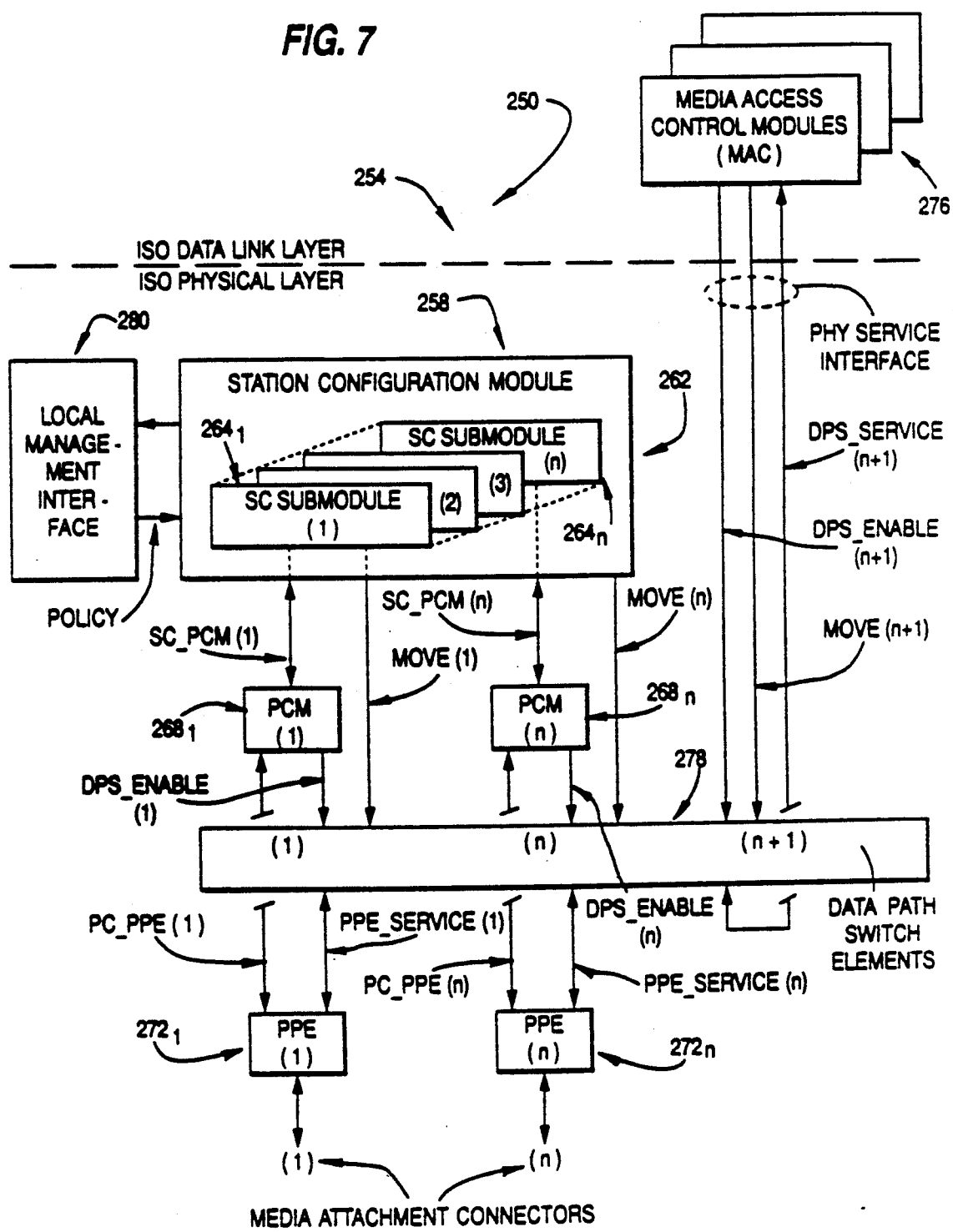
FIG. 7 is a block diagram of the Data Link and Physical layers of a station incorporating the teachings of the present invention.

Turning to FIG. 7, the implementation of the connection matrix by each of the connection types, "A," "B," "M" and "S" will be discussed in detail. Data Link layer 254 and PHY 258 are schematically represented as part of a general model of LAN station 250 of FIG. 7 insofar as they apply to implementation of the connection matrix to automatically control the network topology. Station 250 contains n connection ports or physical attachment points, each having a specified connection type, and each port is represented by i, where i is an integer from 1 to n. Values of i greater than n represent internal MACs in station 250.

Station Configuration Module (SCM) 262 contains the hardware to implement the connection matrix for the station. The SCM is specific to the station type, and its operation for each of the allowable station types, i.e., DAS, DAS/WC, WC, and SAS, will be discussed in greater detail below. SCM 262 contains a number n of station configuration submodules (SCS) $264_1$-$264_n$, one for each connection, or media attachment connector of the station, and each SCS is configured to function as a specific connection type having behavior as specified for such connection type. Each SCS connects to a corresponding physical connection module or manager (PCM) $268_1$-$268_n$, thus establishing the topological behavior of each PHY attachment point. The PCM protocol establishes a shared state with another connected PCM which includes a connection status (either connected or disconnected), and a connection type (A, B, M, or S). Flowchart 300 of FIG. 8, to be discussed below, shows the protocol executed by each PCM to exchange connection types, establish a connection status, and accept, reject, or reconfigure connections.

The PCM protocols are multiple, concurrent processes which exchange information via defined interfaces. The interfaces between the boxes, or entities, in general station 250 of FIG. 7 are given names, and each interface may comprise one or more named signals. If the interface is a single signal, then the interface has the name of the signal. Signals may be of two types, either a control signal which means "do something," or a status variable passing information. Interfaces are shown drawn with single lines, although the signals may comprise one or more parallel bits on a multiline bus.

Interface SC_PCM(i) passes the necessary connection data back and forth between the SCS and the respective PCM. SC_PCM(i) provides a control directive to either connect or disconnect with the adjacent station, a signal PC_type(i), which signifies whether the connection to an adjacent station is determined by SCM to be valid or invalid, i.e., OK and Not_OK, and a signal MY_type(i) which identifies to PCM the respective connection as a connection type "A," "B," "M," or "S." SC_PCM(i) also returns a status signal N_type(i) from the PCM to the SCS, which is the adjacent station (neighbor) type. N_type(i) is either "A," "B," "M," "S", or null, where null means "don't know yet." Internal to SCM 262, SCSs $264_1$-$264_n$ pass signal MODE(i), which has values of Tree, Not_tree, and Root, and the signal Loop_warning, which has values of true and false, among themselves for the purpose of sharing local topology information within the SCM" Signal MOVE(i) provides a true or false input to data path switch element i. Loop_warning is a signal used for reconfiguring the network topology when a connection between a connection type "M" and a connection type "A" of an adjacent station is determined to be invalid.

Signal "Policy," having values of disconnect and move, is input to station 250 of FIG. 7 by a higher layer authority, designer, or manager, shown as local management interface 280, for use in resolution of detected faults in a ring of trees. The options for the manager are to instruct SCM to disconnect invalid tree connections or to reconfigure the invalid tree connections, where possible, as discussed below. Although not shown in the preferred embodiment, the response to an invalid connection could also be to signal the connection as invalid to local management interface 280, but not disconnect the invalid connection.

Figure 9A:
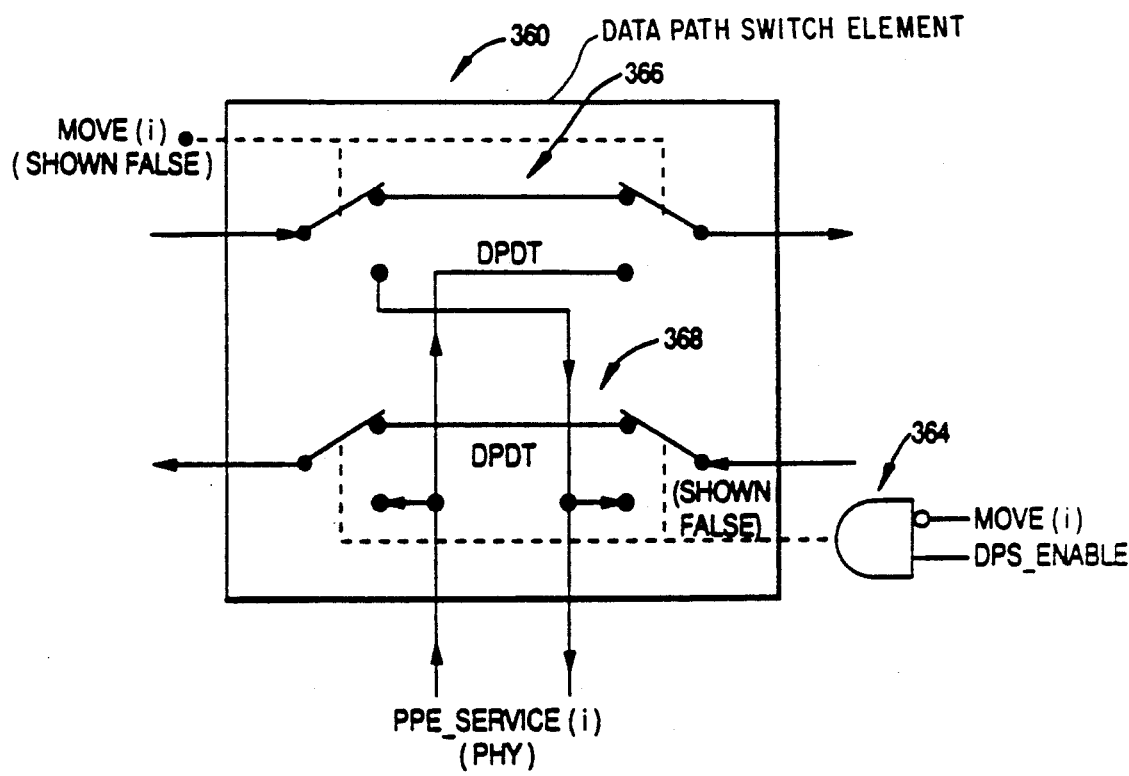
FIG. 9A is an electrical schematic diagram of a single data path switch element.

Each PCM $268_1$-$268_n$ controls a data path switch (DPS) element i of DPS 278, where i is 1 to n+1. DPS elements 1 to n have physical attachment points to external cables (the communications media). DPS element n+1 connects internally to the station primary loop MAC and has no external connection point. Although not shown, DPS element n+2, located between elements n and n−1, could be used to connect a MAC to a secondary ring. Switch 360 of FIG. 9A is an example of a DPS element which is controlled by signals MOVE(i) and DPS_enable, and which provides interface PC_PPE(i) to a respective physical protocol entity (PPE) $272_1$-$272_n$. By controlling the internal configuration, SCM thus controls the externally viewed topology and the function of the PPE. MOVE(i) and DPS_enable(i) are either true or false and switch the respective PCM into or out of the primary ring. As shown in FIG. 9A, when MOVE(i) is false, DPDT switch 366 is in the bypass position, and when MOVE(i) is true and DPS_enable(i) is false, the false output of AND gate 364 sets DPDT switch 368 to the bypass position thereby reordering the attachment points.

Figure 9B:
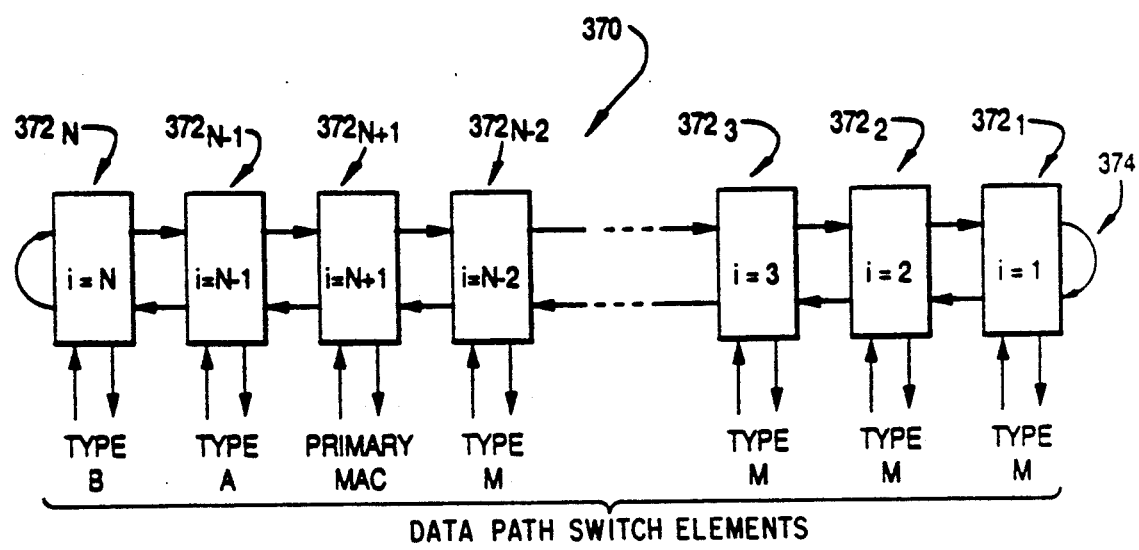
FIG. 9B is a block diagram of several data path switch elements interconnected as shown in FIG. 7.

DPS 278 of FIG. 7 is shown in greater detail by DPS 370 of FIG. 9B. Each DPS element $372_1$-$372_{N+1}$ is a DPS element similar to DPS 360 of FIG. 9A. DPS 370 is a correct configuration of a DPS of a reconfigurable DAS/WC station, shown generally by station 250 of FIG. 7. DPS elements $372_1$-$372_{N-2}$ are ports for connection points to the station as connections type "M." DPS elements $372_{N-1}$ and $372_N$ are connection points for a connection type "A" and a connection type "B," respectively. There may only be one connection type "A" and one connection type "B" in any one station. DPS element $372_{N+1}$ connects to the MAC for the primary ring. Each DPS element is connected on an internal ring 374 that passes through each DPS element twice, connecting to each DPDT switch as shown in FIG. 9A. Ring 374 may be one or more bits wide.

DPS elements $372_1$ to $372_{N+1}$ are identical, regardless of the connection type or internal station entity to which they connect MOVE(i) for each DPS element greater than N−2 is set false, thus defining the internal topology of station 250. The order of DPS elements in a "legal" station, however, is important. DPS elements for connections type "M" must be adjacent to one another on ring 374. DPS element $372_{N+1}$, which connects to the station MAC for the primary ring, is connected between the DPS element $372_{N-1}$ for the connection type "A" and DPS element $372_{N-2}$ for the highest numbered connection type "M." DPS element $372_N$ (the highest numbered DPS element having a connection point external to the station) is connected immediately adjacent to DPS element $372_{N-1}$ for the connection type "A." A DPS element for a MAC for a secondary ring (not shown) would be connected between DPS element $372_{N-1}$ for the connection type "A" and DPS element $372_N$ for the connection type "B." All subsets of DPS 370 are also "legal" data path switches.

Data flow within the DPS is from any of the connections type "M" (DPS elements $372_1$ to $372_{N-2}$) to the DPS element for the primary ring MAC (DPS element $372_{N+1}$) to the DPS element for the connection type "A" (DPS element $372_{N-1}$) to the DPS element for the secondary ring MAC (not shown) and then to the DPS element for the connection type "B." Although each DPS element of DPS 370 is similar, the order of the elements on internal ring 374 governs proper operation of DPS 370.

A DPS has the property that a connection type "M" can be moved from a position electrically located in terms of data flow between two connections type "M" to a position, electrically located in terms of data flow, most distant from the output of the connection type "A." Similarly, MOVE(i) can be used to swap the roles of connections type "A" and "B" or move a MAC to or from a primary or secondary ring.

Each PPE(i) of station 250 of FIG. 7, represented generally by PPE 390 of FIG. 10, encodes and decodes messages for transmission on the communications channel or media. Interface PC_PPE(i) comprises control signals Transmit PDR(i) and LS_request(i). Transmit_PDR(i) is a true or false signal applied to multiplexer 394 of PPE 390 and determines whether signal LS_request(i) or PHY_data_request(i) is encoded by encoder 396 and passed to the media. Multiplexer 394 of FIG. 10, under control of Transmit PDR(i), directs the transmission of LS_request(i) or PHY_data_request(i) from PPE 390. Decoder 398 receives signals from the media and generates LS_indicate(i) and PHY_data_indicate(i).

LS_request(i) is the line state message sent to the adjacent station, and comprises the prior mentioned line states QLS, HLS, MLS, IQLS and ILS, or a combination of codes to signal connection type. PHY_data_request(i) is the data from the next PHY entity or from a higher layer of the station. Interface PC_PPE(i) also provides status signal LS_indicate(i), which is passed from a PPE to its respective PCM. LS_indicate(i) is the line state or message representing its connection type received from the adjacent station.

Each PPE(i) has a PPE service interface, PPE service(i), which passes protocol data units transmitted to or received from the media. The ring is formed of point to point links, thus data is often passed directly between PPE's as determined by the DPS. Each station may have any number of MACs or no MACs. MAC 276 is connected to data path switch element n+1 because switch n+1 does not correspond to a physical attachment point for the media.

PHY_data_indicate(i) is the name of the data received by the PPE from the media, and as mentioned, PHY_data_request(i) is the name of the data output to the PPE towards the media.

Flowchart 300 of FIG. 8 shows the sequence of events performed by each PCM(i) to establish contact with a PCM(i) of an adjacent (connected neighbor or "OTHER END" as shown by the connection matrix) station and to validate the connection.

In accordance with the invention a method is provided for exchanging station connection information over the physical connections, or media, between adjacent stations Steps 304-324 of flowchart 300, provided by way of example and not as a limitation, show the steps performed by PCM(i) to exchange station connection information.

Initially, LS_request(i) is set to QLS, Transmit_PDR(i) is set to false, and N_type(i) is set to null in step 304. DPS_enable(i) is always set equal to Transmit_PDR(i). After an initialization time $T_b$, timer TLA is reset to zero, step 308, and LS_request is sent to DLS, where DLS represents the set of line states or line state messages that identify the connection type, i.e., "A," "B," "M," or "S," of the PCM(i), which corresponds to MY_type(i), step 312. The duration of $T_b$ is chosen to be long enough to ensure that the adjacent station's PCM(i) has time to "see" the transmitted QLS, and thus ensuring the initialization of a new connection.

If LS_indicate(i), the line state message from the adjacent connection, is a valid line state, as determined in step 316, N_type(i) is set to the connection type corresponding to the signaled line state, step 320. The ":=" convention used in step 320 indicates that N_type (i) is set equal to one of the values "A," "B," "M," or "S" in the set DLS. MY_type is signaled until time period $T_{dmin}$ to ensure the connection type is received by the adjacent station. The duration of $T_{dmin}$ is chosen to ensure that MY_type(i) is signaled long enough to be received by the adjacent station's PCM(i). If N_type(i) has been set, processing continues to determine if the connection is valid according to the allowable connections of the connection matrix, step 328. Depending on the connection type of the station doing the processing (MY_type), step 328 implements the process depicted by the flowcharts of FIGS. 11 (MY_type(i)="A"), 12 (MY_type(i)="B"), 13 (MY_type(i)="M"), or 16 (MY_type(i)="S"), which will be discussed below.

If the N_type(i) to MY_type(i) connection is valid as decided in PCM according to the connection matrix, PC_type(i) is OK, and Transmit_PDR(i) is set to true to permit PPE(i) 390 to send data or an idle line state, step 332, indicating that the connection is accepted locally at "MY" end. If the connection is not valid, PCM(i) continues to look at LS_indicate(i) in order to validate any corrected configuration. During operation, PCM(i) continues to monitor LS_indicate(i), step 336, and if LS_indicate(i) is not either an active or idle line state, the connection type for LS_indicate(i) is compared to the prior value of N_type(i), step 340. If the new and old connection types disagree, or no type is sent, the connection is again initialized starting at step 304.

In accordance with the invention a method is provided for determining, in each of the stations by analysis of exchanged information, the validity of the connection to each of the adjacent stations according to a predetermined validation list. As shown by way of example and not as a limitation, flowchart 400 of FIG. 11 presents the steps performed by a station having a connection of type "A," i.e., MY_type(i)="A," to validate according to the connection matrix the connection to an adjacent station having a connection type of N_type(i).

Initially, in step 404, Loop warning is false and PC_type(i) is Not_ok. MODE(i) is Not_tree, and MOVE(i) is false, step 408. N_type(i) is ascertained by PCM. If N_type(i) is null in step 412, connection is not yet established or connection has been broken and processing returns to step 408. If N_type(i) is no longer null, then processing of the connection type can continue with step 416. According to the connection matrix, a MY_type(i) of "A" may not connect to an N_type(i) of "A" or "S." Therefore, if N_type(i) is "A," PC_type is set to Not_ok (which controls concurrent PCM(i) processing as shown by flowchart 300 of FIG. 8), thereby rejecting the connection as invalid according to the connection matrix. Loop_warning is set to false, and an illegal connection is signaled in step 420. Local management interface 280 of FIG. 7 is informed of the illegal connection and sets an audio or visual alarm. In the preferred embodiment, PCM(i), having a PC_type(i)=Not_ok signal in step 328 of FIG. 8, continues to attempt to validate the connection, effectively locking out LAN data transfer other than line states between the PCM(i) and the adjacent station. Although not incorporated in the preferred embodiment, it is also valid to set an alarm, as will be discussed below, and to continue using the connection until fixed by a system operator, rather than to isolate the invalid connection.

Figure 11:
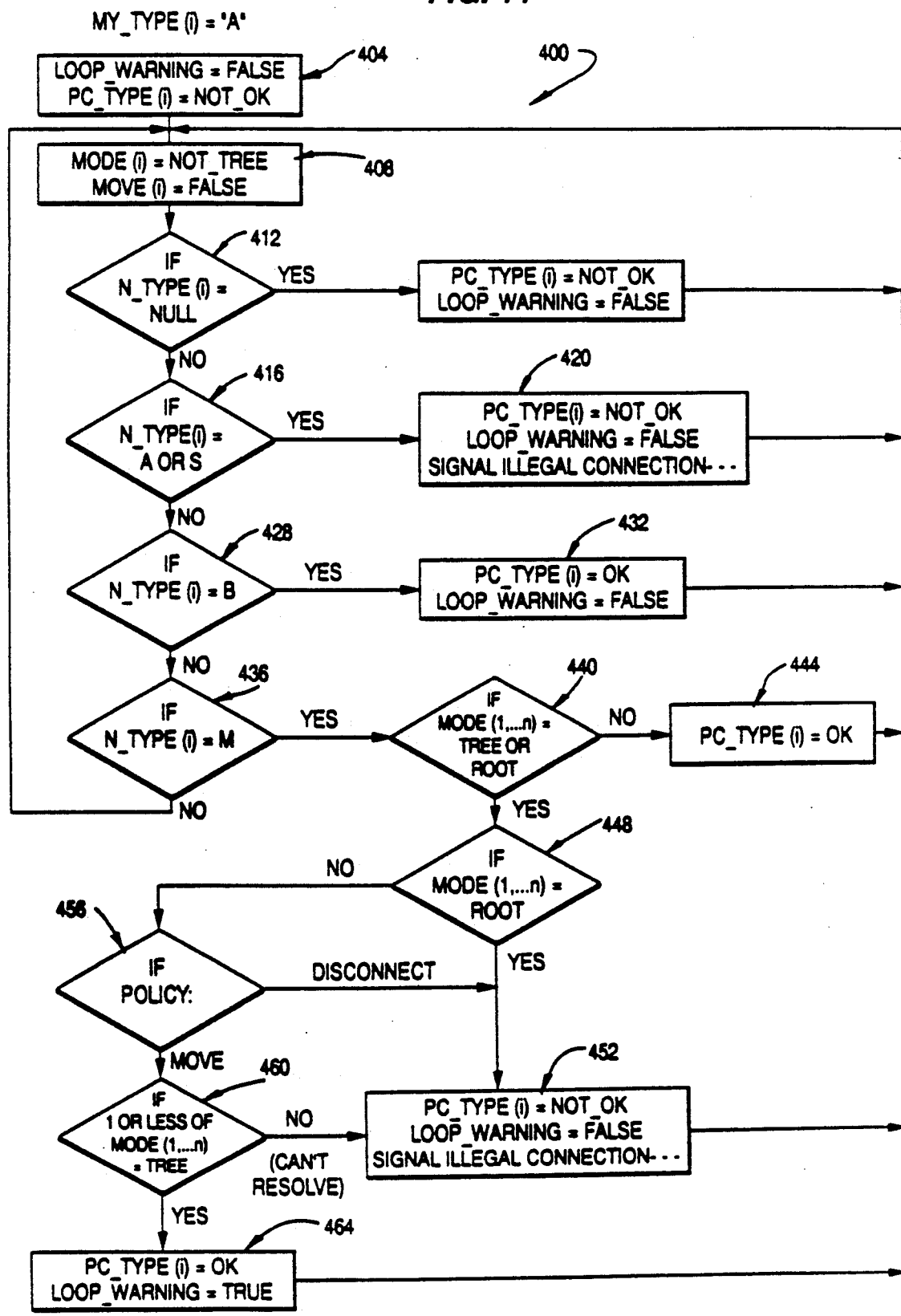
FIG. 11 is a flow chart of the functions performed by a PCM having a physical connection type "A," as part of step 328 of FIG. 8.

If N_type(i) is not "A," processing continues with step 428 of FIG. 11. According to the connection matrix, if MY_type(i) is "A" and N_type(i) is "B," step 428, the connection is valid, PC_type(i) is set to OK, Loop_warning is set to false, step 432, and processing continues. If N_type(i) is neither "A," "B," nor "S," N_type(i) is checked for type "M," step 436. If N_type(i) is not "M," the validation process is started over. If N_type(i) is "M," the connection matrix requires application of the rule: MY_type "A" may keep a connection to an N_type "M" if and only if an "M" or a "B of MY" station does not connect to an N_type "A."

Application of the rule concerning trees begins in step 440, where the value of MODE(i) is checked for each SCS of "MY" station. If MODE(i) is not tree or root, then PC_type(i) is OK, step 444, and the connection is valid. MODE(i) is set to tree if MY_type(i) is "M" and it is connected to an N_type(i) of "A," as shown in steps 616 and 620 of FIG. 13. MODE(i) is set to root in steps 520 and 524 of FIG. 12 if MY_type(i) is "B" and N_type(i) is "A."

If any MODE(i) of the SCM is root in FIG. 11, step 448, then the connection is invalid, and in step 452, PC_type(i) is set to Not_ok, which rejects the connection, Loop_warning is set to false, and an illegal connection is signaled to local management interface 280 of FIG. 7. Local management interface 280 indicates that the connection is invalid. If a MODE(1, . . . ,n) in step 448 is tree, then the status of Policy, step 456, determines if the topology is to be reconfigured or whether the connection is to be considered invalid and rejected. Step 456 implements the policy set by the local station manager. If the policy is to disconnect N type(i) ="M" connections to connected to MY_type(i)="A" connections which are invalid under the rule because another MY_type(i) "M" within "MY" station is connected to a N_type(i) "A," then step 452 of FIG. 11 is executed to set PC_type(i) to Not_ok, thereby rejecting the connection, set Loop_warning to false, and to signal an illegal connection to local management interface 280 of FIG. 7, which indicates that the connection is invalid. If the policy is to reconfigure the topology to correct the global topology problem caused by MY_type(i) connection type "A" to N_type(i) connection type "M," then step 460 is executed.

In step 460, if less than two of the MODE(i) signals are tree, i.e., zero or one MY_type(i) connections type "M" are connected to an N_type(i) connection type "A," then Loop_warning is set to true and PC_type(i) is set to OK and the connection is accepted. Application of Loop_warning to topology reconfiguration will be discussed below in regard to validation by a MY_type(i) connection type "M," which is shown by flowchart 600 of FIG. 13 and is shown electrically in FIGS. 14 and 15. Loop_warning equal to "true" causes the DPS to move the connection having MODE(i)="tree." If more than one MODE(i)="tree," then the topology can t be resolved with local information and step 452 is executed rejecting the connection offered to the connection type "A."

Figure 12:
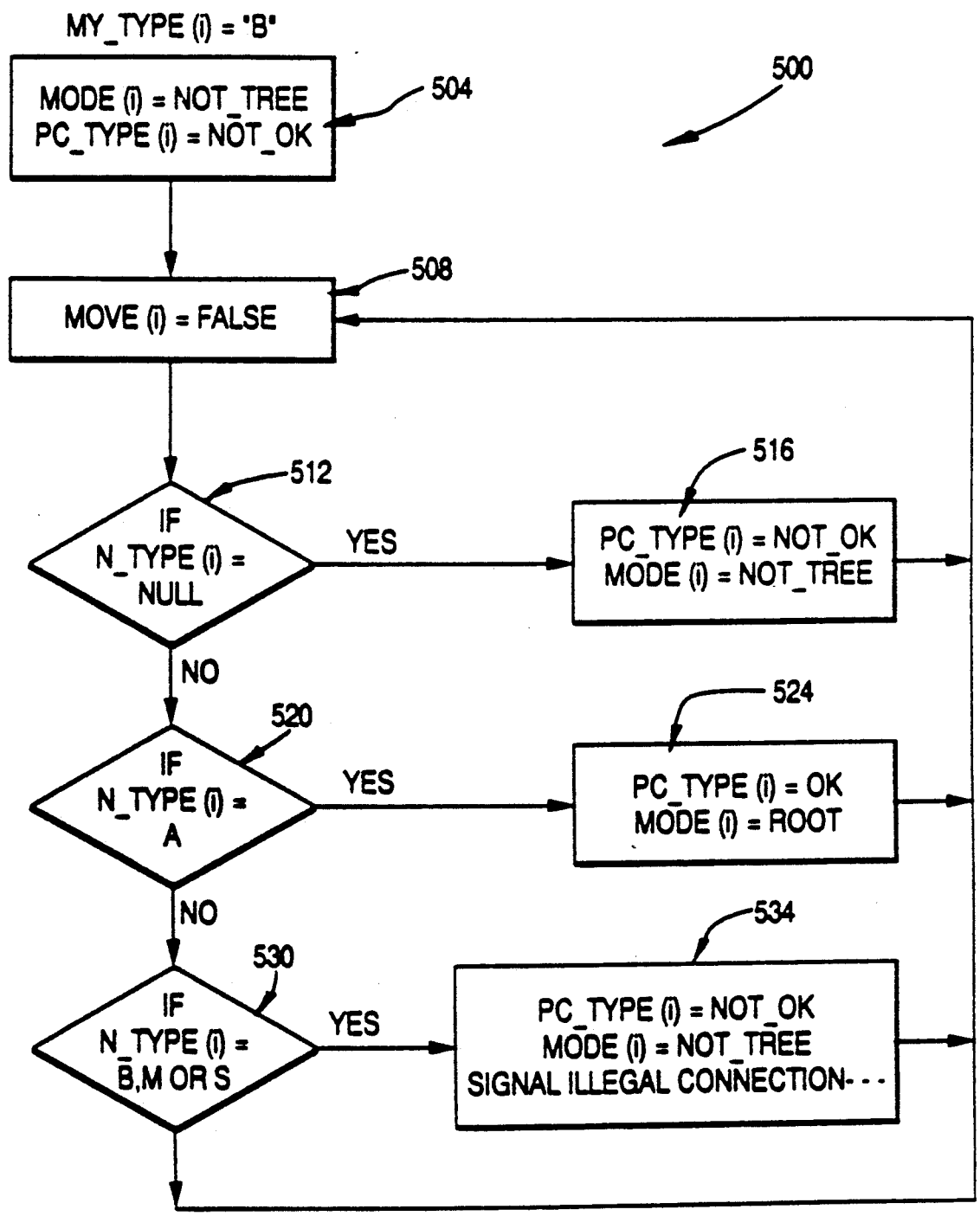
FIG. 12 is a flow chart of the functions performed by a PCM having a physical connection type "B," as part of step 328 of FIG. 8.

Turning now to the case of an SCS having MY_type(i)="B," the functions performed in determining the validity of the connections to adjacent stations are shown by flowchart 500 of FIG. 12. Initially MODE(i) is Not_tree and PC_type(i) is Not_ok, step 504, and MOVE(i) is false, step 508.

If N_type(i) is null in step 512, meaning N_type(i) has not yet been determined, PC_type(i) is set to Not_ok and MODE(i) is set to Not_tree, step 516, and the process is repeated beginning at step 508. If N_type(i) is "A" in step 520, the connection is valid according to the connection matrix, PC_type(i) is set to OK, and MODE(i) is set to root for application of the rule by another MY_type(i) connection type A of MY_station, as discussed above in relation to flowchart 400 of FIG. 11. If N_type(i) is "B," "M," or "S" in step 530, the connection is not valid according to the connection matrix. Therefore, PC_type(i) is set to Not_ok, which rejects the invalid connection, MODE(i) is set to Not_tree, and an illegal connection in step 534 is signaled to local management interface 280 of FIG. 7 which identifies invalid connection.

Figure 13:
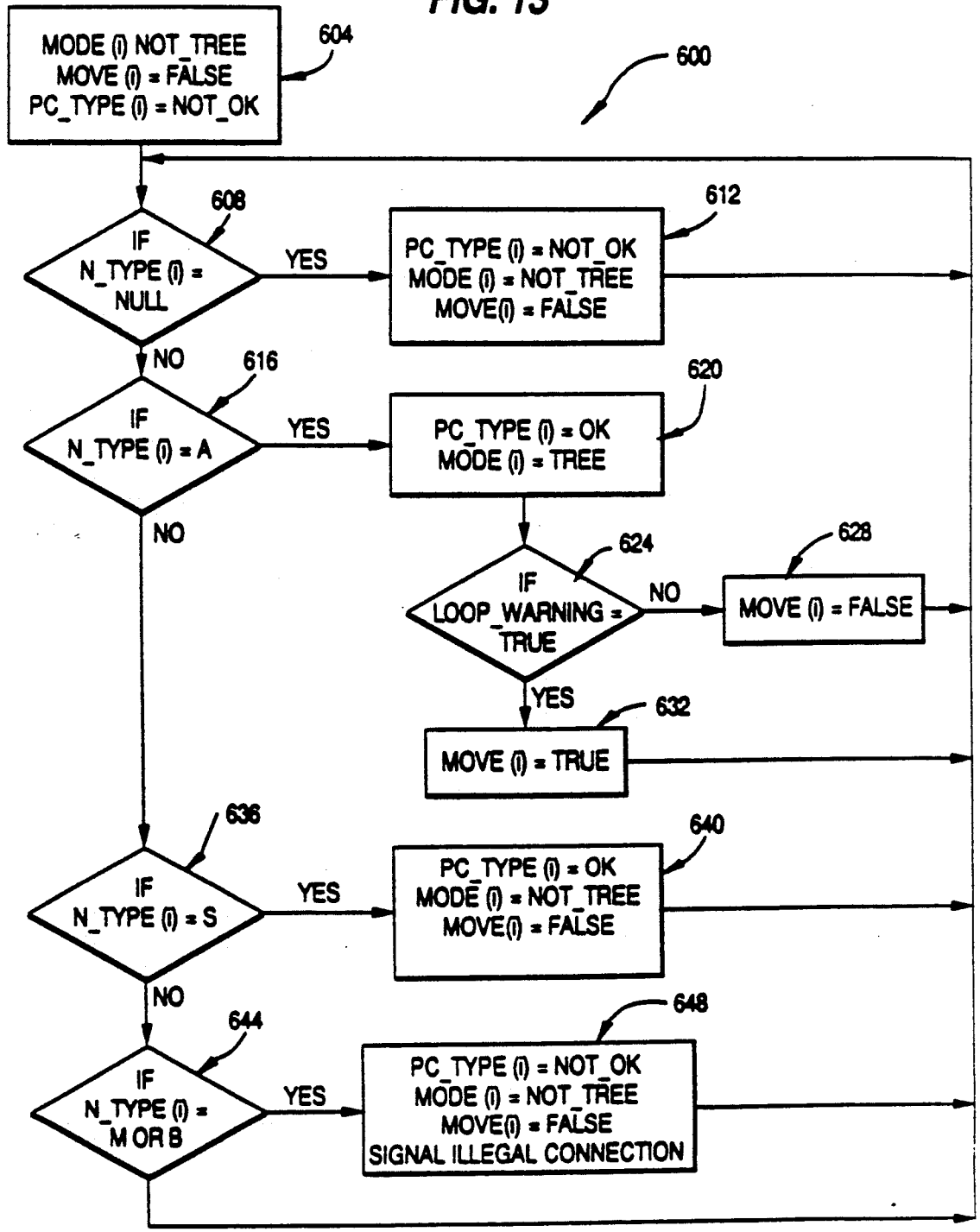
FIG. 13 is a flow chart of the functions performed by a PCM having a physical connection type "M," as part of step 328 of FIG. 8.

Now addressing the case for an SCS having MY_type(i)="M," the functions performed by PCM(i) in determining the validity of connections to adjacent stations is shown by flowchart 600 of FIG. 13. MODE(i) is initially set to Not_tree, MOVE(i) is set to false, and PC_type(i) is set to Not_ok, step 604. If N_type(i) is null in step 608, PC_type(i) is set to Not_ok, MODE(i) is set to Not_tree, and MOVE(i) is set to false in step 612. If N_type(i) is "A" in step 616, then the connection is valid according to the connection matrix, PC_type(i) is set to OK and MODE(i) is set to tree in step 620.

At this point, if application of the rule in steps 440-464 of FIG. 11 determined that the topology need not be reconfigured, i.e., Loop_warning is false, MOVE(i) is set to false and operation of PCM(i) continues. If the topology is to be reconfigured (as directed by an external policy decision), a method is provided to reconfigure connections that are invalid according to a validation list. As shown by way of example and not as a limitation, signals MOVE(i) and MODE(i), and Loop_warning are used by PCM(i) as shown in steps 620-632 of flowchart 600 to shift the corresponding DPS element to reconfigure connections that are invalid according to the connection matrix. Accordingly, when Loop_warning is set to true in step 464 of FIG. 11 and is detected in step 624 of FIG. 13, MOVE(i) is set to true in step 632, which alters the configuration of the respective data path switch element and the internal topology of this station.

Figure 14:
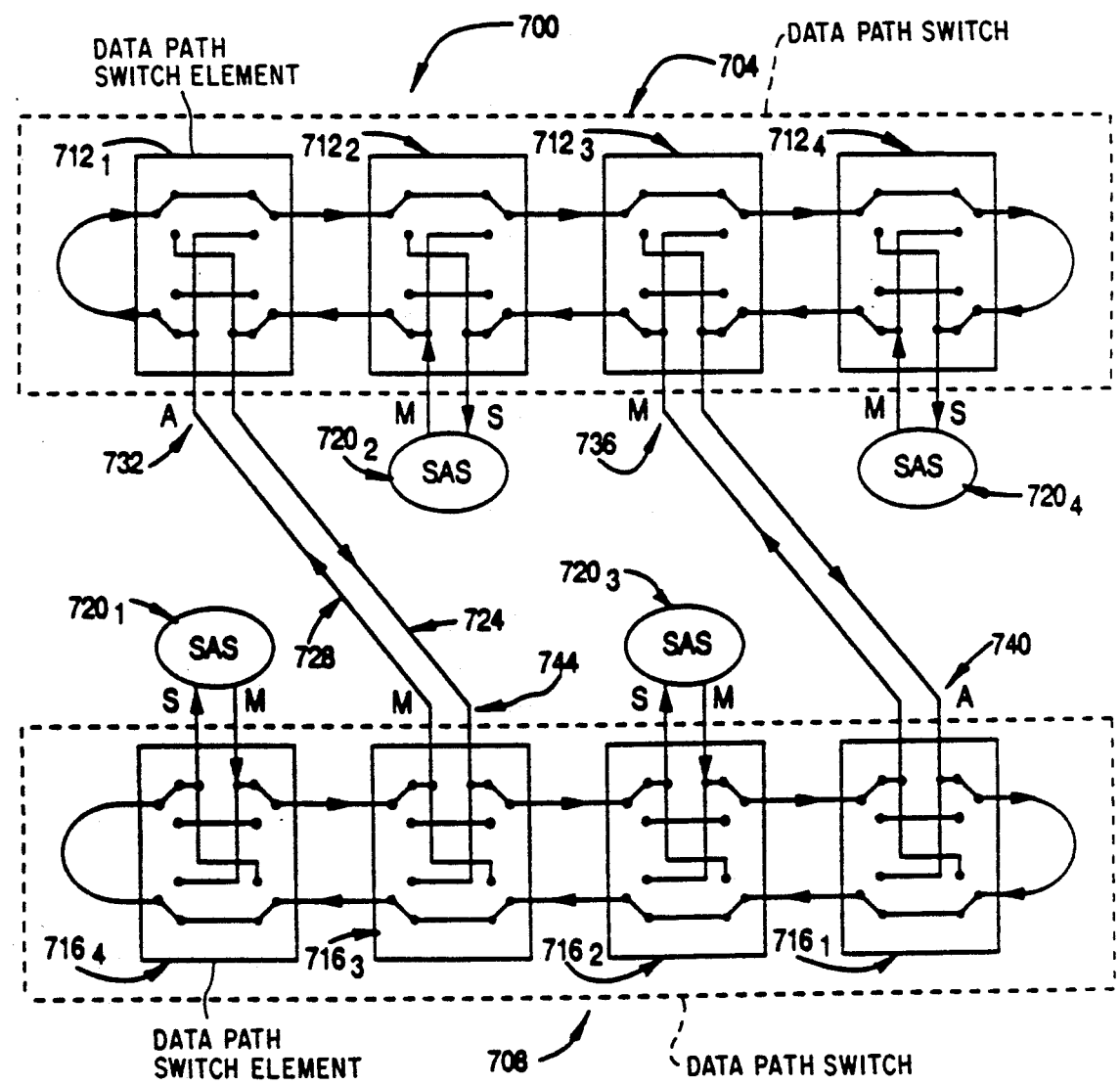
FIG. 14 is an electrical schematic diagram of a LAN having an illegal topology according to the present invention.
Figure 15:
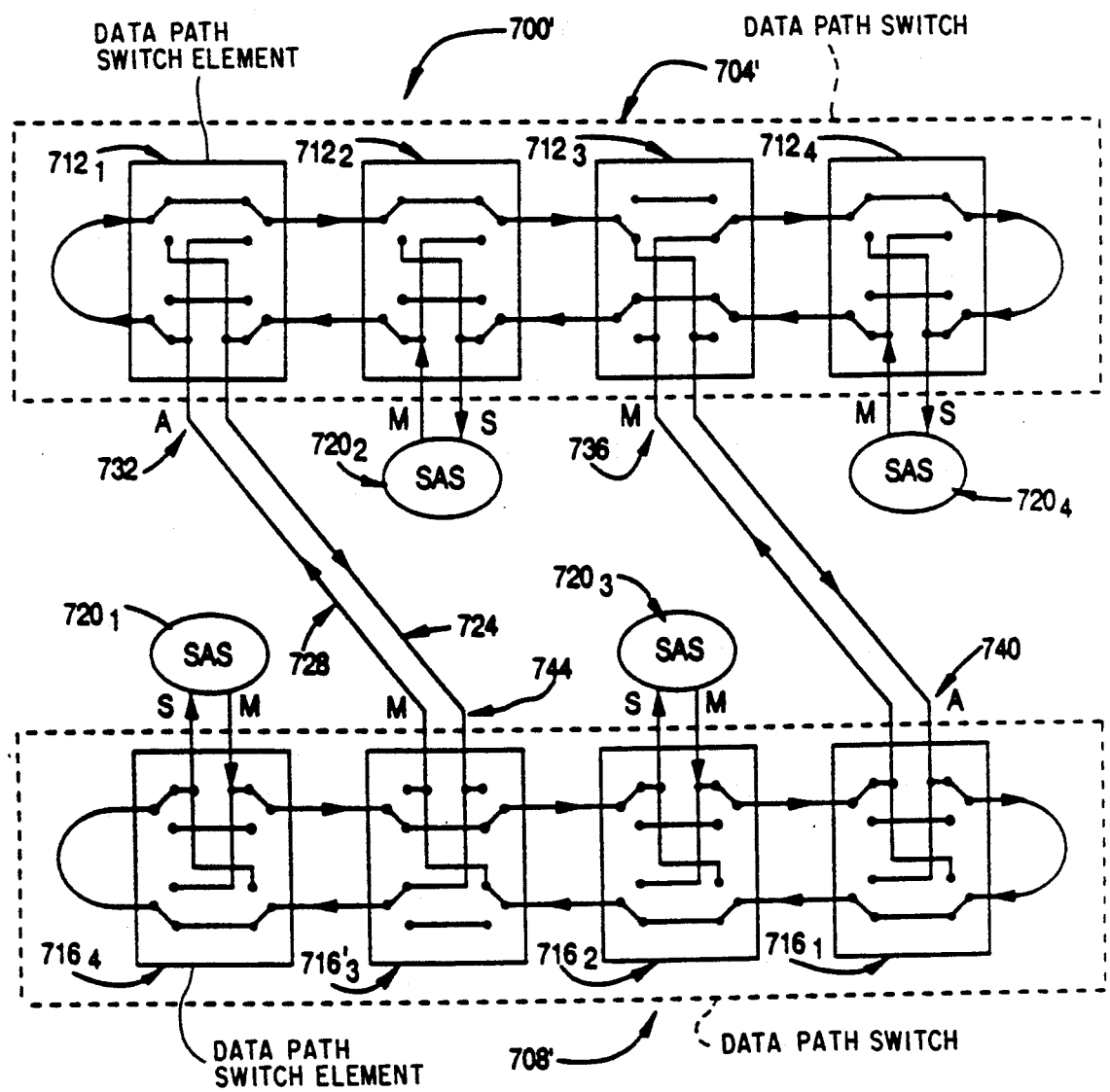
FIG. 15 is an electrical schematic diagram of the LAN of FIG. 14 reconfigured according to the teachings of the present invention to have a legal topology.

An example of internal station reconfiguration and the effect on a LAN is shown by FIGS. 14 and 15. LAN 700, which is configured in the same manner and having the same connectivity problem as LAN 100 of FIG. 4, comprises two DAS/WC stations 704 and 708, each having a connection type "A" and a plurality of connections type "M." The connection type "A" of each DAS/WC is connected to a connection type "M" of the adjacent DAS/WC. For simplicity, only the DPS of stations 704 and 708 are shown. No connections type "B" are needed for the example and are therefore not shown. Each DAS/WC contains four data path switch elements $712_1$-$712_4$ and $716_1$-$716_4$. Each data path switch element is controlled by signals DPS_enable(i) and MOVE(i) as shown by FIG. 9A. Each double pole double throw (DPDT) switch 366, 368 of data patch switch element 360 is shown positioned for a respective control signal for that switch of false. MOVE(i) and DPS_enable(i) control DPDT switch 366 through AND gate 364.

Before reconfiguration, LAN connectivity is absent. Even though each SAS of LAN 700 is physically connected, SASs $720_1$ and $720_4$ are not logically connected to SASs $720_2$ and $720_3$ or primary loop 724. Application of the rule to connection type "A" 732 illustrates detection of an invalid connection of MY_type(i) "A" to an N_type(i) "M" because another connection type "M," 736, of "MY" station is connected to a connection type "A." Applying the rule to connection type "A" 740 of station 708 reveals the same type of invalid connection After detection of the invalid connection, taking station 704 as "MY" station, and connection 736 as the MY_type(i) connection type "M" under analysis, Loop_warning is true in step 624 of FIG. 13 because it was set by SCS(i) connection type "A" in step 464 of FIG. 11. MOVE(i), where i now represents connection 736, is therefore set to true in step 632 of FIG. 13. Likewise, if station 708 is assumed to be "MY" station, MOVE(i) for 744 is set to true. As a result, data path switch elements $712_3$ and $716_3$ are reconfigured as shown in FIG. 15. The topology has successfully been reconfigured to place all four SASs $720_1$-$720_4$ in primary loop 724 by electrically moving the connection type "M" data path switch element in the "OTHER" station to the location most distant, from the viewpoint of data flow, from the connection type "A" output of the "OTHER" station. The "location most distant" is the location where data from the connection type "M"

data path switch element in the "OTHER" station must flow through all the connections type "M" of the "OTHER" station before reaching the connection type "A" output of the "OTHER" station. This reconfiguration function is applicable to a tree of arbitrary height.

Returning to flowchart 600 of FIG. 13, if N_type(i) is "S" rather than "A" in step 636, the connection is valid according to the connection matrix and PC_type(i) is set to OK, MODE(i) is set to Not_tree, and MOVE(i) is set to false in step 640. If N_type(i) is "B" or "M" in step 644, the connection is invalid according to the connection matrix and, in step 648, PC_type(i) is set to Not_ok, MODE(i) is set to Not_tree, MOVE(i) is set to false, the connection is rejected, and an illegal connection is signaled to local management interface 280 of FIG. 7.

Figure 16:
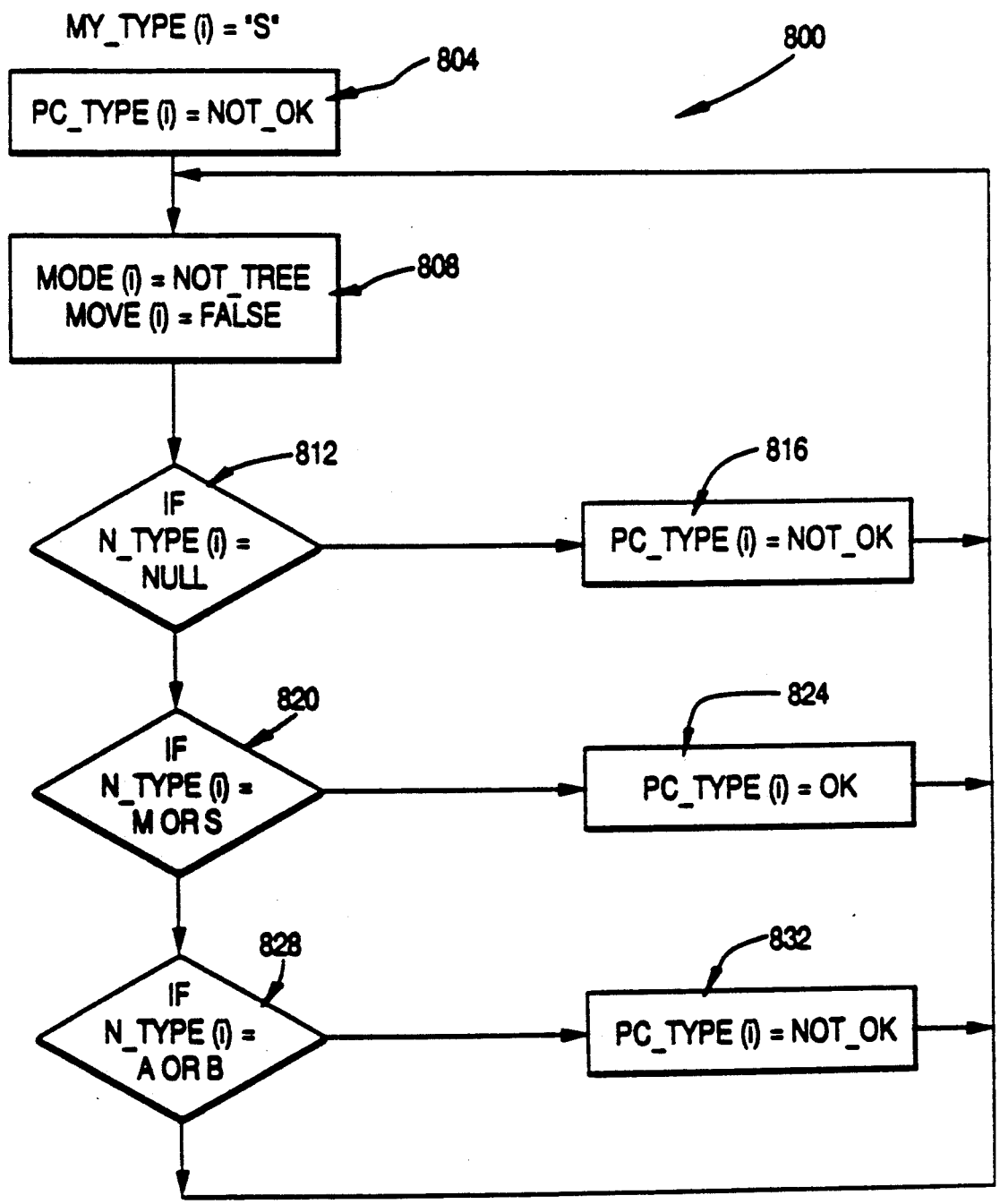
FIG. 16 is a flow chart of the functions performed by a PCM having a physical connection type "S," as part of step 328 of FIG. 8.

The validation of the connections to the last remaining connection type, "S," is performed by PCM(i) according to flowchart 800 of FIG. 16. Initially, in step 804, PC_type(i) is set to Not_ok. In step 808, MODE(i) is set to Not_tree and MOVE(i) is set to false. In step 812, if N_type(i) is null, PC_type(i) is set to Not_ok in step 816 and validation starts over at step 808. If N_type(i) is "M" or "S" in step 820, the connection is valid according to the connection matrix. Therefore, PC_type(i) is set to OK. If N_type(i) is "A" or "B" in step 828, the connection is invalid and PC_type(i) is set to Not_ok.

The preferred connection matrix is shown by way of example and not as a limitation as just one of many possible connection matrices that would be useful to implement a LAN topology autoconfiguration. As previously mentioned, "A" to "S" and "B" to "S" connection types were declared invalid for convenience of configuring networks as double loop topologies, not because of logical connectivity problems. Likewise "B" to "M" connections could be declared valid by the rule, while "A" to "M" connections could be invalid or either can be accepted in absence of the other, provided preference is given to one type of connection to provide that the topology will be deterministic.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of applicant's general inventive concept.

What is claimed is:

1. A method for controlling the topology of a local area network (LAN) having a plurality of stations, each of the stations being any one of a single attachment station (SAS), a dual attachment station (DAS), a wire concentrator station (WC), a SAS/WC station, or a DAS/WC station, the plurality of stations each being interconnected by duplex point to point physical connections, the method comprising the steps of:
    exchanging station connection information over the physical connections only between adjacent stations;
    determining, in each of the stations, by analysis of said exchanged connection information, the validity of all connections to each of said adjacent stations according to a predetermined connection list;
    identifying, in each of the stations, valid and invalid connections according to said connection list; and
    performing, in each of the stations, actions relating to the interconnections of the station, based on the results of the identifying step for the station, the actions of all the stations achieving a globally designated primary ring.

2. The method of claim 1 wherein said step of exchanging includes a step of exchanging three distinct types of messages.

3. The method of claim 1 wherein each of the physical connections of a station has two links and said step of determining includes a step of identifying one or both of said links of each of the duplex point to point physical connections to form a globally designated primary ring.

4. The method of claim 1 wherein said physical connections define a primary ring including at least a first one of the stations and also define a second ring including at least a second one of the stations, and wherein said performing step includes a step of internally reconfiguring the first station, thereby allowing the second station to communicate over said globally designated primary ring.

5. The method of claim 1 wherein said performing step includes the steps of rejecting said invalid connections and preventing, via an internal reconfiguration of the station, the transmission or reception of user data over said rejected connections.

6. The method of claim 1 wherein each SAS has a physical connection of connection type "S", each DAS has physical connections of a connection type "A" and a connection type "B", each WC has a plurality of physical connections of a connection type "M", and each DAS/WC has physical connections of a connection type "A", a connection type "B" and a plurality of connection type "M", and wherein said step of exchanging includes exchanging information indicating the connection type of said physical connections of said adjacent stations.

7. The method of claim 6 wherein said step of exchanging includes exchanging messages corresponding to each of said connection types.

8. The method of claim 1 wherein said step of determining includes a step of deciding the validity of said connection to each of said adjacent stations based upon the connection type of physical connection of the station sending said connection information and the connection type of the physical connection receiving said connection information.

9. The method of claim 8 wherein said step of determining includes a step of validating said connections according to the following connection matrix:

| "OTHER END" | "MY END" | | | |
|---|---|---|---|---|
| | A | B | M | S |
| A | I | V | V | I |
| B | V | I | I | I |
| M | RULE | I | I | V |
| S | I | I | V | V |

V = VALID
I = INVALID wherein the columns of said matrix correspond to the connection type of a physical connection of a first one of the stations at an end of a physical connection designated MY END, and the rows of said matrix correspond to the connection type sent by a second one of the stations at an end of a physical connection designated OTHER END, and wherein said RULE permits as valid a connection type "A" at the MY END to a connection type "M" at the OTHER END if and only if no connection type "M" or connection type "B" of said first one of the stations at the MY END is connected to a connection type "A" for said second one of the stations at the OTHER END.

10. The method of claim 8 wherein said step of deciding includes the step of validating the connecting of a connection type "A" of a first one of the stations to a connection type "B" of a second one of the stations, invalidating the connecting of a connection type "A" of a first one of the stations to a connection type "A" of a second one of the stations and invalidating the connecting of a connection type "B" of a first one of the stations to a connection type "B" of a second one of the stations.

11. The method of claim 8 wherein said step of deciding includes the steps of invalidating the connecting of a connection type "B" of a first one of the stations to a connection type "M" of a second one of the stations, and validating the connecting of a connection type "A" of a first one of the stations to a connection type "M" of a second one of the stations if and only if no connection type "M" or connection type "B" of said first one of the stations is connected to a connection type "A" of said second one of the stations.

12. The method of claim 8 wherein said step of deciding includes a step of invalidating the connecting of a connection type "M" of a first station to a second station which is a DAS or DAS/WC when a connection type "A" or "B" of said first station is connected to a connection type "M" of a third station.

13. The method of claim 9 wherein said physical connections define a primary ring and also define a second ring including a tree of DAS/WC stations, each having an invalid physical connection of connection type "M", and wherein said performing step includes, for each DAS/WC station in a tree, a step of internally reconfiguring the DAS/WC stations, thereby allowing the stations to communicate over said globally designated primary ring.

14. A local area network (LAN) having a self controlling topology comprising:
a plurality of stations, each of said stations being any one of a single attachment station (SAS), a dual attachment station (DAS), a wire concentrator station (WC), an SAS/WC station or a DAS/WC station;
a plurality of duplex point to point physical connections interconnecting said stations;
means, in each station, for exchanging station connection information, including connection type information for the physical connections, over said physical connections only between adjacent stations;
means for determining, in each of the stations by analysis of said exchanged information, the validity of all connections to each of said adjacent stations according to a predetermined connection list;
means, in each station, responsive to the determining means, for identifying valid and invalid connections according to said connection list; and
means, in each station, responsive to the identifying means, for performing actions relating to the interconnection of the station, the actions of all the stations achieving a globally designated primary ring.

15. The LAN of claim 14 wherein said means for exchanging includes means for exchanging connection information including three distinct types of messages.

16. The LAN of claim 14 wherein each of said physical connections of a station has two links and said means for determining includes means for identifying as valid one or both of said links of each of the duplex point to point physical connections that form a globally designated primary ring.

17. The LAN of claim 14 wherein said means for performing includes means for rejecting, via an internal reconfiguration of the station, said invalid connections, thus preventing the transmission or reception of user data over said rejected connections.

18. The LAN of claim 14 wherein said connections define a primary ring including at least a first one of the stations and also define a second ring including at least a second one of the stations, and wherein said means for performing includes means for internally reconfiguring the first station, thereby allowing the second station to communicate over said primary ring.

19. The LAN of claim 16 wherein each said SAS includes a physical connection of connection type "S", each said DAS includes physical connections of a connection type "A" and a connection type "B", each said WC includes a plurality of physical connections of a connection type "M", and each said DAS/WC includes physical connections having a connection type "A", a connection type "B", and a plurality of connections type "M".

20. The LAN of claim 19 wherein said exchanged information indicates the connection type of said adjacent station.

21. The LAN of claim 19 wherein said means for exchanging includes means for exchanging messages corresponding to said connection type.

22. The LAN of claim 16 wherein said means for determining includes means for deciding the validity of said connection to each of said adjacent stations based upon the connection type of the physical connection of the station sending said connection information and the connection type of the physical connection receiving said connection information.

23. The LAN of claim 19 wherein said means for determining includes means for validating said connections according to the following connection matrix:

| "OTHER END" | "MY END" | | | |
| --- | --- | --- | --- | --- |
| | A | B | M | S |
| A | I | V | V | I |
| B | V | I | I | I |
| M | RULE | I | I | V |
| S | I | I | V | V |

V = VALID
I = INVALID wherein the columns of said matrix correspond to the connection type of a physical connection of a first one of the stations at an end of a physical connection designated MY END and the rows of said matrix correspond to the connection type signaled by a second one of the stations at an end of a physical connection designated OTHER END, and wherein said RULE permits as valid a connection type "A" at the MY END to a connection type "M" at the OTHER END if and only if no connection type "M" or connection type "B" of said first one of the stations at the MY END is connected to a connection type "A" for said second one of the stations at the OTHER END.

24. The LAN of claim 22 wherein said means for deciding includes means for validating the connecting of a connection type "A" of a first one of the stations to a connection type "B" of a second one of the stations, invalidating the connecting of a connection type "A" of a first one of the stations to a connection type "A" of a second one of the stations and invalidating the connecting of a connection type "B" of a first one of the stations to a connection type "B" of a second one of the stations.

25. The LAN of claim 22 wherein said means for deciding includes means for invalidating the connecting of a connection type "B" of a first one of the stations to a connection type "M" of a second one of the stations, and validating the connecting of a connection type "A" of a first one of the stations to a connection type "M" of a second one of the stations if and only if no connection type "M" or connection type "B" of said first one of the stations is connected to a connection type "A" of said second one of the stations.

26. The LAN of claim 22 wherein said means for deciding includes means for invalidating the connecting of a connection type "M" of a first station to a second station which is a DAS or DAS/WC when a connection type "A" or "B" of said first station is connected to a connection type "M" of a third station.

27. The LAN of claim 14 wherein said means for determining includes means associated with each of said physical connections of a connection type "A" for sending a first message type, means in each of said physical connections of a connection type "B" for sending a second message type, means in each of said physical connections of a connection type "M" for sending a third message type, and means in each of said physical connections of a connection type "S" for sending a fourth message type.

28. The LAN of claim 27 wherein said means for determining includes means in each of said physical connections of said connection type "A" for accepting as valid said second and third message type, means in each of said physical connections of said connection type "B" for accepting as valid said first message type, means in each of said physical connections of said connection type "M" for accepting as valid said first and fourth message types, and means in each of said physical connections of said connection type "S" for accepting as valid said third and fourth message types.

29. The LAN of claim 27 wherein said second and third messages are identical.

30. The LAN of claim 28 wherein said second and third messages are identical.

31. The LAN of claim 22 wherein each of said DAS/WC stations includes means for reconfiguring the station when the validity of a connection between adjacent stations is determined to be invalid.

32. The LAN of claim 31 wherein said connections define a primary ring including at least one of the stations and also define a second ring including at least a second one of the stations having a physical connection with a connection type "M", and wherein said means for reconfiguring includes means for internally reconfiguring the station, therefore allowing the station to communicate over said primary ring.

33. A local area network (LAN) station having one or more duplex point to point physical connections capable of interconnecting the station and other stations in the LAN, comprising:
a PHY layer interface for connecting the station to the physical connections of the station;
means for sending station connection information over said physical connections;
means for receiving only adjacent station connection information from said physical connections;
means for determining by analysis of said received station connection information, the validity of all connections to adjacent stations according to a predetermined connection list;
means for identifying invalid connections according to said connection list; and
means, responsive to the identifying means, for performing actions relating to the interconnection of the station, achieving a globally designated primary ring.

34. The station of claim 33 wherein said means for sending includes means for exchanging connection information including three types of messages.

35. The station of claim 33 wherein each of the physical connections of the station has two links and said means for determining includes means for identifying as valid one or both of said links of each of the physical connections that form a globally designated primary ring.

36. The station of claim 33 wherein said means for identifying includes means for rejecting said invalid connections.

37. The station of claim 35 wherein said connections define a primary ring including at least the station and also define a second ring including at least a second station, and wherein said means for performing includes means for internally reconfiguring the station, thereby allowing the second station to communicate over said primary ring.

38. The station of claim 37 further including a connection of a predetermined connection type to said physical connection.

39. The station of claim 38 wherein the station is a single attachment station (SAS) having a physical connection with a connection type "S".

40. The station of claim 38 wherein the station is a dual attachment station (DAS) having physical connections of a connection type "A" and a connection type "B".

41. The station of claim 38 wherein the station is a wire concentrator (WC) having a plurality of physical connections of a connection type "M".

42. The station of claim 38 wherein the station is a DAS/WC having physical connections of a connection type "A", a connection type "B", and a plurality of connections type "M".

43. The station of claims 41 or 42 wherein said means for reconfiguring includes means for allowing a station having a physical connection of a connection type "M" to communicate over said primary ring.

44. The station of claim 43 wherein each of said physical connections has a data path switch element connected to said physical connection.

45. The station of claim 38 wherein said received information indicates the connection type of said adjacent station.

46. The station of claim 38 wherein said means for sending includes means for sending messages corresponding to said connection type.

47. The station of claim 38 wherein said means for receiving includes means for receiving messages corresponding to a connection type of said adjacent station.

48. The station of claims 39, 40, 41, or 42 wherein said means for determining includes means for deciding the validity of a connection to an adjacent station based upon said connection type of the station and said connection type indicated by said received station connection information.

49. The station of claim 48 wherein said means for determining includes means for validating said connections according to the following connection matrix:

| "OTHER END" | "MY END" | | | |
|---|---|---|---|---|
| | A | B | M | S |
| A | I | V | V | I |
| B | V | I | I | I |
| M | RULE | I | I | V |
| S | I | I | V | V |

V = VALID
I = INVALID wherein the columns of said matrix correspond to the connection type of a physical connection of the station at an end of a physical connection designated MY END, and the rows of said matrix correspond to the connection type signaled by an adjacent station at an end of a physical connection designated OTHER END, and wherein said RULE permits as valid a connection type "A" of the station at the MY END to a connection type "M" of said adjacent station at the OTHER END if and only if no connection type "M" or connection type "B" of the station at the MY END is connected to a connection type "A" of said adjacent station at the OTHER END.

50. The station of claim 48 wherein said means for deciding includes means for validating the connecting of a connection type "A" of the station to a connection type "B" of said adjacent station, invalidating the connecting of a connection type "A" of the station to a connection type "A" of said adjacent station and invalidating the connecting of a connection type "B" of the station to a connection type "B" of said adjacent station.

51. The station of claim 48 wherein said means for deciding includes means for invalidating the connecting of a connection type "B" of the station to a connection type "M" of said adjacent station, and validating the connecting of a connection type "A" of the station to a connection type "M" of the adjacent station if and only if no connection type "M" or connection type "B" of the station is connected to a connection type "A" of said adjacent station.

52. The station of claim 48 wherein said means for deciding includes means for invalidating the connecting of a connection type "M" of the station to a second station which is a DAS or DAS/WC when a connection type "A" or "B" of the station is connected to a connection type "M" of a third station.

53. The station of claim 38 wherein said means for sending includes signaling means for sending a first message type indicating a connection type "A", a second message type indicating a connection type "B", a third message type indicating a connection type "M", and a fourth message type indicating a connection type "S".

54. The station of claim 53 wherein said means for determining includes means in each of the physical connections of said connection type "A" for accepting as valid said first, second and fourth message types, means in each of the physical connections of said connection type "B" for accepting as valid said first message type, means in each of the physical connections of said connection type "M" for accepting as valid said first, second and fourth message types, and means in each of the physical connections of said connection type "S" for accepting as valid said second, third and fourth message types.

55. The station of claim 53 wherein said second and third messages are identical.

56. The station of claim 54 wherein said second and third messages are identical.

57. The station of claim 48 wherein said DAS/WC station includes means for internally reconfiguring the station to provide that stations communicate on a particular ring when the connection to an adjacent station is determined to be invalid.

58. The station of claim 57 wherein said means for reconfiguring includes means for reconfiguring the station having a physical connection to allow a station having a connection type "M" to communicate over said primary ring.

59. The station of claim 58 wherein said means for reconfiguring includes a data path switch having a plurality of data path switch elements, each connected to a physical connection to the station.

60. The station of claim 59 further including a loop shaped data path connecting to each of said data path switch elements, and wherein each data path switch element includes means for locating one of the physical connections in either of a first position that would allow communication over a primary ring and a second position that would allow communication over a secondary ring in said network.

61. The method of claim 6 wherein said step of determining includes a step of deciding the validity of a first connection between a first station and a second station based upon the connection types of the first connection and the connection types of a second connection between the first station and a third station.

62. The method of claim 1 wherein the determining step includes the steps of sending, by each of said physical connections of a connection type "A", connection information of a first message type; sending, by each of said physical connections of a connection type "B", connection information of a second message type; sending, by each of said physical connections of a connection type "M", connection information of a third message type; and sending, by each of said physical connections of a connection type "S", connection information of a fourth message type.

* * * * *